(12) United States Patent
Vishnia

(10) Patent No.: US 11,835,789 B2
(45) Date of Patent: Dec. 5, 2023

(54) MIRROR-BASED ASSEMBLIES, INCLUDING LATERAL TRANSFER HOLLOW RETROREFLECTORS, AND THEIR MOUNTING STRUCTURES AND MOUNTING METHODS

(71) Applicant: PLX, Inc., Deer Park, NY (US)

(72) Inventor: Itai Vishnia, Setauket, NY (US)

(73) Assignee: PLX, Inc., Deer Park, NY (US)

( * ) Notice: Subject to any disclaimer, the term of this patent is extended or adjusted under 35 U.S.C. 154(b) by 215 days.

(21) Appl. No.: 16/853,526

(22) Filed: Apr. 20, 2020

(65) Prior Publication Data

US 2021/0325632 A1 Oct. 21, 2021

(51) Int. Cl.
| | | |
|---|---|---|
| *G02B 7/198* | (2021.01) | |
| *G02B 5/12* | (2006.01) | |
| *G02B 5/08* | (2006.01) | |
| *G02B 7/182* | (2021.01) | |

(52) U.S. Cl.
CPC ............... *G02B 7/198* (2013.01); *G02B 5/08* (2013.01); *G02B 5/12* (2013.01); *G02B 7/182* (2013.01)

(58) Field of Classification Search
CPC . G02B 5/08; G02B 5/12; G02B 5/136; G02B 7/198; G20B 7/182
USPC .......................... 359/838, 855, 856, 857, 871
See application file for complete search history.

(56) References Cited

U.S. PATENT DOCUMENTS

| | | | | |
|---|---|---|---|---|
| 2,129,189 | A | * | 9/1938 | Alder ..................... A47G 1/215 |
| | | | | 248/478 |
| 2,627,206 | A | * | 2/1953 | Clark ..................... A61B 1/247 |
| | | | | 359/882 |
| 3,936,194 | A | | 2/1976 | Lipkins |
| 3,977,765 | A | * | 8/1976 | Lipkins ................. G02B 5/122 |
| | | | | 359/529 |
| 4,065,204 | A | | 12/1977 | Ipkins |
| 4,319,804 | A | | 3/1982 | Ipkins |
| 4,367,922 | A | | 1/1983 | Ipkins |
| 5,024,514 | A | | 6/1991 | Bleier et al. |
| 5,122,901 | A | | 6/1992 | Bleier |
| 5,227,921 | A | | 7/1993 | Bleier et al. |

(Continued)

FOREIGN PATENT DOCUMENTS

| | | |
|---|---|---|
| CN | 2233091 Y | 8/1996 |
| CN | 104090316 | 8/2014 |

(Continued)

OTHER PUBLICATIONS

International Search Report and Written Opinion issued in PCT/US21/28177, dated Jul. 27, 2021.

*Primary Examiner* — Ricky D Shafer

(74) *Attorney, Agent, or Firm* — Ice Miller LLP

(57) ABSTRACT

An improved mirror-based assembly is provided. The mirror-based assembly has at least one mirror panel, at least one support member, and at least three connection regions between the at least one support member and the at least one mirror panel, comprising at least a first connection region comprising a miter joint connection region, at least a second connection region comprising a non-miter joint connection region, and at least a third connection region, wherein the at least one mirror panel is connected to the at least one support member to minimize thermal expansion or contraction of the at least one mirror panel and a method for assembling the same.

16 Claims, 25 Drawing Sheets

(56) References Cited

U.S. PATENT DOCUMENTS

| | | | |
|---|---|---|---|
| 5,301,067 A | 4/1994 | Bleier et al. | |
| 5,335,111 A | 8/1994 | Bleier | |
| 5,361,171 A | 11/1994 | Bleier | |
| 5,486,913 A | 1/1996 | Aharon | |
| 5,589,991 A | 12/1996 | Bleier | |
| 5,625,501 A | 4/1997 | Taggert | |
| 5,828,505 A * | 10/1998 | Farmiga | G02B 27/0977 359/857 |
| 5,949,543 A | 9/1999 | Bleier et al. | |
| 6,141,101 A | 10/2000 | Bleier et al. | |
| 6,322,222 B1 * | 11/2001 | Kobayashi | G02B 5/08 248/467 |
| 6,473,185 B2 | 10/2002 | Vishnia et al. | |
| 6,729,735 B2 | 5/2004 | Bleier | |
| 6,752,503 B2 | 6/2004 | Bleier | |
| 6,786,608 B1 | 9/2004 | Bleier | |
| 6,827,455 B2 | 12/2004 | Bleier | |
| 6,945,661 B2 | 9/2005 | Bleier | |
| 7,168,817 B2 | 1/2007 | Bleier et al. | |
| 7,210,822 B2 * | 5/2007 | Liu | G02B 27/0994 362/346 |
| 7,268,960 B2 | 9/2007 | Vishnia | |
| 7,995,208 B2 | 8/2011 | Jacobson et al. | |
| 8,083,359 B2 | 12/2011 | Mohazzab | |
| 8,092,030 B2 | 1/2012 | Bleier | |
| 8,120,853 B2 | 2/2012 | Jacobson et al. | |
| 8,205,852 B2 | 6/2012 | Jacobson et al. | |
| 8,205,853 B2 | 6/2012 | Bleier et al. | |
| 8,454,176 B2 | 6/2013 | Bleier | |
| 8,567,968 B2 | 10/2013 | Bleier | |
| 8,827,468 B2 | 9/2014 | Bleier | |
| 8,827,470 B2 | 9/2014 | Bleier | |
| 8,851,689 B2 * | 10/2014 | Bleier | G01J 3/0286 359/871 |
| 9,013,814 B2 | 4/2015 | Bleier et al. | |
| 9,097,586 B2 | 8/2015 | Bleier et al. | |
| 9,377,600 B2 | 6/2016 | Vishnia et al. | |
| 9,557,452 B2 | 1/2017 | Shen | |
| 9,798,051 B2 | 10/2017 | Bleier et al. | |
| 9,884,208 B2 | 2/2018 | Humphrey | |
| 10,175,395 B2 | 1/2019 | Bleier et al. | |
| 10,222,580 B2 | 3/2019 | Vishnia et al. | |
| 10,393,994 B2 | 8/2019 | Bleier et al. | |
| 10,641,989 B2 * | 5/2020 | Bleier | G02B 5/122 |
| 2002/0126294 A1 | 9/2002 | Vishnia et al. | |
| 2003/0002178 A1 | 1/2003 | Bleier | |
| 2004/0001251 A1 * | 1/2004 | Huang | G02B 27/0994 359/368 |
| 2004/0057140 A1 | 3/2004 | Bleier | |
| 2004/0190168 A1 | 9/2004 | Bleier | |
| 2004/0196576 A1 | 10/2004 | Bleier | |
| 2004/0223241 A1 | 11/2004 | Bleier et al. | |
| 2006/0072974 A1 * | 4/2006 | Johnson | B23B 49/02 408/115 R |
| 2006/0210235 A1 | 9/2006 | Shen | |
| 2007/0035836 A1 | 2/2007 | Lyon | |
| 2007/0103797 A1 | 5/2007 | Vishnia | |
| 2007/0295155 A1 | 12/2007 | Bleier | |
| 2010/0012808 A1 | 1/2010 | Jacobson et al. | |
| 2010/0033728 A1 | 2/2010 | Jacobson et al. | |
| 2010/0128374 A1 * | 5/2010 | Zaglin | G02B 5/08 359/866 |
| 2011/0273778 A1 | 11/2011 | Jacobson et al. | |
| 2011/0308060 A1 | 12/2011 | Bleier | |
| 2011/0310504 A1 | 12/2011 | Bleier | |
| 2012/0091310 A1 | 4/2012 | Jacobson et al. | |
| 2012/0113522 A1 | 5/2012 | Jacobson et al. | |
| 2012/0218654 A1 | 8/2012 | Bleier et al. | |
| 2013/0135026 A1 | 5/2013 | Bleier et al. | |
| 2013/0135622 A1 | 5/2013 | Bleier et al. | |
| 2013/0138226 A1 | 5/2013 | Bleier et al. | |
| 2013/0167353 A1 | 7/2013 | Bleier | |
| 2013/0326862 A1 | 12/2013 | Bleier | |
| 2014/0029009 A1 | 1/2014 | Bleier et al. | |
| 2014/0029010 A1 | 1/2014 | Bleier et al. | |
| 2014/0209803 A1 | 7/2014 | Hamberger et al. | |
| 2015/0007428 A1 | 1/2015 | Vishnia et al. | |
| 2015/0007429 A1 | 1/2015 | Vishnia et al. | |
| 2015/0008303 A1 | 1/2015 | Vishnia et al. | |
| 2015/0008304 A1 | 1/2015 | Vishnia et al. | |
| 2017/0307843 A1 * | 10/2017 | Bleier | G02B 5/122 |
| 2018/0011230 A1 | 1/2018 | Bleier et al. | |
| 2019/0146181 A1 | 5/2019 | Vishnia et al. | |
| 2019/0219792 A1 | 7/2019 | Vishnia et al. | |
| 2019/0353873 A1 | 11/2019 | Bleier et al. | |
| 2021/0124101 A1 * | 4/2021 | Vishnia | G02B 7/1825 |
| 2021/0325632 A1 | 10/2021 | Vishnia | |

FOREIGN PATENT DOCUMENTS

| | | |
|---|---|---|
| CN | 106569324 A | 3/2019 |
| WO | 9924784 A1 | 5/1999 |
| WO | 03003078 A1 | 1/2003 |
| WO | 2004008229 A3 | 7/2004 |

* cited by examiner

MIRROR-BASED ASSEMBLIES, INCLUDING LATERAL TRANSFER HOLLOW RETROREFLECTORS, AND THEIR MOUNTING STRUCTURES AND MOUNTING METHODS

BACKGROUND OF THE INVENTION

This invention relates to the field of mirror-based assemblies, for use as and in optical assemblies. Examples of such mirror-based assemblies include, but are not limited to, flat mirror panels, hollow retroreflectors, roof mirror assemblies, lateral transfer hollow retroreflectors, and periscopes.

Optical assemblies containing mirror panels have typically been connected to support members by simple methods, such as utilizing all flat regions to mate the parts together. While some approaches may be easiest for assembly and manufacturing, specifically regarding part complexity and tolerances, such a design is not necessarily optimized for thermal effects such as contraction and expansion. Furthermore, during thermal excursion of significant temperatures, these types of thermal effects may translate into degradation of optical performance, such as but not limited to, surface flatness, beam deviation, wavefront shape, peak-to-valley or rms values or any combination thereof.

U.S. Pat. No. 5,024,514 to Morton S. Lipkins and Zvi Bleier, and U.S. Pat. No. 5,361,171 to Zvi Bleier which disclosed a lateral transfer hollow retroreflector with the mirror assemblies connected solely via flat sections orientated perpendicular to the reflective surface.

U.S. Pat. No. 6,729,735, to Zvi Bleier, which disclosed a mirror panel with chamfered surfaces connected to a mirror panel housing with chamfered surfaces. With such a design, there may be some reduction in stresses caused by thermal expansion or contraction, but not fully optimized by only using a single geometry. Additionally, fully chamfered edges be more challenging for manufacturing efforts without the full benefits of performance.

There is a need for a more multifaceted approach that utilizes a complex integration of both miter and non-miter connection regions between the members of the mirror-based assembly to optimize performance. The present invention achieves high performance even with thermal effects utilizing a specific structural approach for connecting mirror panels and support members.

SUMMARY OF THE INVENTION

The invention accordingly comprises the features of construction, combination of elements and arrangements of parts and sequence of steps which will be exemplified in the construction, illustration and description hereinafter set forth, and the scope of the invention will be indicated in the claims.

Accordingly, it is an object of the present invention to provide an improved mirror-based assembly having a structure that minimizes the effect of thermal contraction, expansion or the combination of the effects on the optical performance of such a mirror-based assembly.

It is a particular object of the present invention to provide an improved mirror-based assembly having improved optical performance.

In accordance with the invention an improved mirror-base assembly is provided. The mirror-based assembly has at least one mirror panel, at least one support member, and at least three connection regions between the at least one support member and the at least one mirror panel, comprising at least a first connection region comprising a miter joint connection region and at least a second connection region comprising a non-miter joint connection region and at least a third connection region, wherein the at least the first mirror panel is connected to the at least one support member to minimize thermal expansion or contraction of the at least the first mirror panel.

In accordance with an additional aspect of the invention, an improved roof mirror assembly is provided. The roof mirror assembly has at least two mirror panels, at least one support members, and at least three connection regions between the at least one support member and the at least one mirror panel, comprising at least a first connection region comprising a miter joint connection region and at least a second connection region comprising a non-miter joint connection region and a third connection region, wherein the at least one mirror panel is connected to the at least one support member to minimize thermal expansion or contraction of the at least one mirror panel.

In accordance with yet another aspect of the invention, A lateral transfer hollow retroreflector device, comprising at least two subassemblies, wherein each of the at least two subassemblies comprising at least one mirror panel, at least one support member, and at least three connection regions between the at least one support member and the at least one mirror panel, comprising at least a first connection region comprising a miter joint connection region and at least a second connection region comprising a non-miter joint connection region, wherein each of the at least one mirror panels of the at least two subassemblies are connected to the at least one support member to minimize thermal expansion or contraction of the at least one mirror panel.

In accordance with yet another aspect of the invention, an improved lateral transfer hollow retroflector assembly is provided. The lateral transfer hollow retroflector assembly has at least two subassemblies, wherein each subassembly comprises at least one mirror panel, at least one support member, at least three connection regions between the at least one support member and the at least one mirror panel, comprising at least a first connection region comprising a miter joint connection region and at least a second connection region comprising a non-miter joint connection region, wherein the at least one mirror panel is connected to the at least one support member to minimize thermal expansion or contraction of the at least one mirror panel.

In accordance with at least another aspect of the invention, an improved lateral transfer hollow retroflector assembly is provided. The lateral transfer hollow retroflector assembly has at least two subassemblies, wherein the first two subassemblies comprises at least two mirror panels, at least three support member, at least six connection regions between the at least one support member and the at least one mirror panel, comprising at least a first connection region comprising a miter joint connection region and at least a second connection region comprising a non-miter joint connection region, wherein the at least one mirror panel is connected to the at least one support member to minimize thermal expansion or contraction of the at least one mirror panel.

In accordance with a further aspect of the invention, an improved method for a mirror-base assembly is provided. The method for a mirror-base assembly having at least one mirror panel, at least one support member, at least three connection regions between the at least one support member and the at least one mirror panel, comprising at least a first connection region comprising a miter joint connection region and at least a second connection region comprising a non-miter joint connection region and a third connection region, wherein the at least one mirror panel is connected to the at least one support member to minimize thermal expansion or contraction of the at least one mirror panel. The steps of the method are assembling the one or more support members having miter joint structure to a mirror panel by the second connection region having a miter joint, and assembling the one or more support members having non-miter joint structure to a mirror panel by the first connection region having a non-miter joint.

The present invention and one or more components thereof may also be used in conjunction with any suitable mirror-based optical assembly or assemblies including but not limited to those disclosed in U.S. Pat. Nos. 5,122,901, 5,227,921, 5,301,067, 5,335,111, 5,361,171, 5,486,913, 5,589,991, 5,625,501, 5,949,543, 6,141,101, 6,473,185 B2, 6,729,735 B2, 6,752,503, B2, 6,786,608 B1, 6,827,455 B2, 6,945,661 B2, 7,168,817 B2, 7,268,960 B2, 7,995,208 B2, 8,092,030 B2, 8,120,853 B2, 8,205,853 B2, 8,205,852 B2, 8,454,176 B2, 8,567,968 B2, 8,827,470 B2, 8,827,468 B2, 8,851,689 B2, 9,013,814 B2, 9,097,586 B2, 9,377,600 B2, 9,798,051 B2, 10,175,395 B2, 10,393,994 B2 and 10,222,580 B2, each of which patents are incorporated by reference herein in their entireties.

Other objects of the invention will in part be apparent from the following description taken in associations with the figures.

The invention accordingly comprises an assembly, and a method of assembling an assembly, possessing the features, properties and relation of components which will be exemplified in the products hereinafter described, and the scope of the invention will be indicated in the claims.

BRIEF DESCRIPTION OF THE DRAWINGS

For a fuller understanding of the invention, reference is made to the following description taken in connection with the accompanying drawings, in which.

DETAILED DESCRIPTION OF THE PREFERRED EMBODIMENTS

Figure 1:
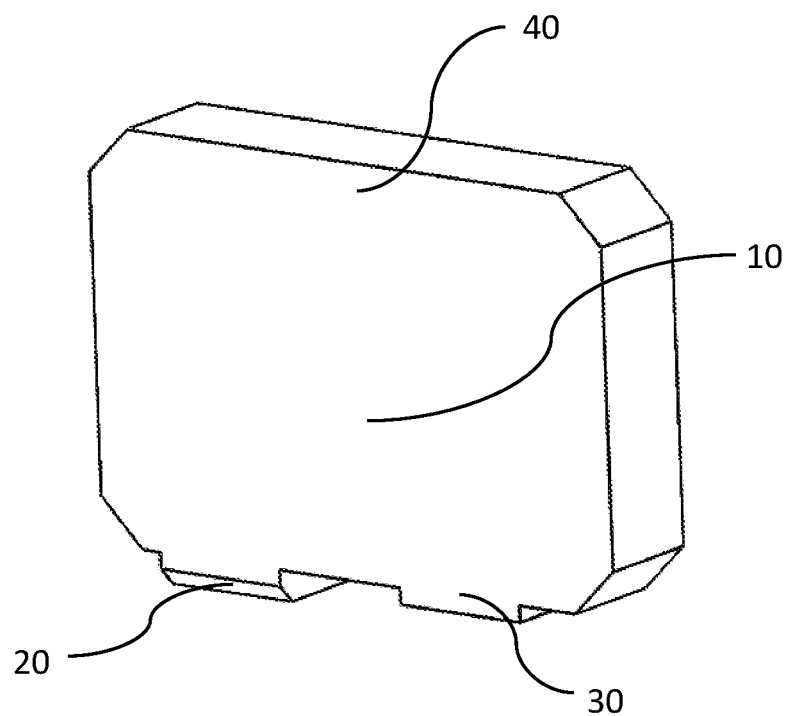
FIG. 1 is a perspective view of a mirror panel of a mirror-based assembly having miter and non-miter connection regions, namely a miter, a pad and a flat joint structure, made in accordance with at least the first embodiment of the present mirror-based assembly invention.

As set forth in the background section above, and as will be appreciated below, the presented invention is primarily directed to a mirror-based assembly, a roof mirror assembly and its integration into a lateral transfer hollow retroreflector. It will be made clear from the below description of the construction of each assembly, that each assembly is unique and not obvious in view of existing prior art.

Throughout this specification and in the claims, reference to a "miter", "miter joint structure", "miter connection region", or combinations thereof, is meant to refer to an angular joint ranging between substantially 25 degrees and 75 degrees, including but not limited to, 45 degrees, and where any non-miter "joint", "structure", "connection region", etc., is meant to refer to any substantially non-angular joint, as for example the "flat", "pin" or "pad" structure described herein. As just discussed, and also throughout the specification and claims, a "flat, "flat joint structure", "flat connection region", or combinations thereof, is meant to refer a substantially flat single surface of the mirror panel or a pad extending from a mirror panel then being discussed, wherein the "connection region" for a "flat joint structure" is between a substantially flat surface of the mirror panel or pad to a substantially flat surface of a support member. See, for example, connection regions (30) and (40) of FIGS. 1-3 for mirror panel 10. As also just discussed, and throughout the specification and claims, a "pad", "pad joint structure", "pad connection region", or combinations thereof, is meant to refer to an element extending from an edge surface of a mirror panel, wherein the "connection region" for a pad is between the several substantially flat, miter and/or non-miter surfaces of the extended element of the mirror panel to respectively, substantially flat, miter and/or non-miter surfaces of a support member, for example, as seen at (20) and (30) of FIGS. 1-3 for mirror panel 10. It is also to be understood throughout the specification and the claims that the "pads" can either be monolithically formed extensions from the mirror panel, or originally separate elements which may be attached to the mirror panel through various means. As also just discussed, and throughout the specification and claims, a "pin", "pin joint structure", "pin connection region", or combinations thereof, is meant to refer to a substantially cylindrically shaped element that may either extend from the mirror or the support member into a mating joint structure of the respective element. It is also to be understood throughout the specification and the claims that the "pins" can either be monolithically formed extensions, completely separate elements, or originally separate elements which may be attached to the mirror panel or support member through various means.

Throughout this specification and in the claims, reference to a support member can be but is not limited to one or more of the following or any combination thereof, support block, base, housing, optical platform, monolithic structure, mirror, prism, retroreflector and lateral transfer hollow retroreflector. Further, the materials for the mirror-based assembly can be any combination or mixture of materials, including, but not limited to, glass, low expansion glass, ceramics, metals or metallics. In such an assembly, the materials may also be matched by coefficient-of-thermal-expansion (CTE) in order to further decrease optical errors induced by thermal contraction or expansion.

Figure 2:
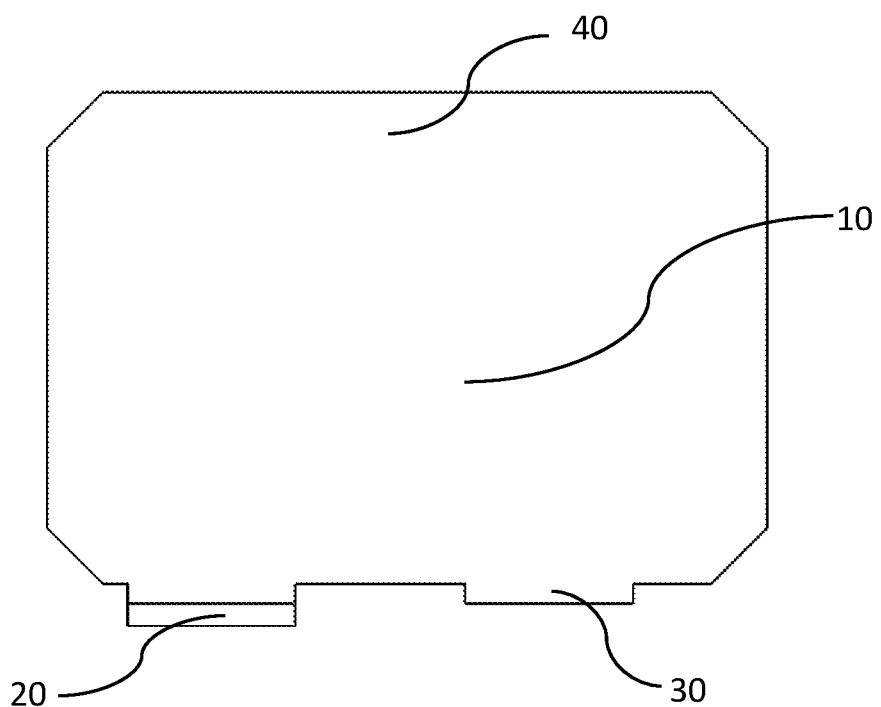
FIG. 2 is a front elevational view of FIG. 1.
Figure 3:
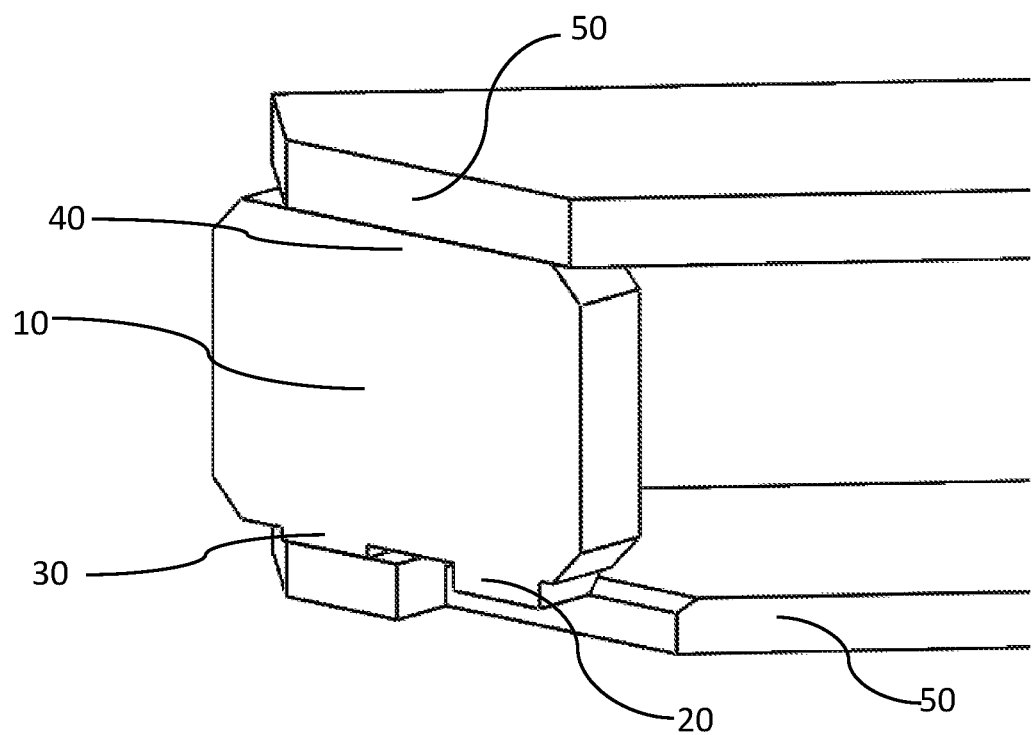
FIG. 3 is a perspective view of a mirror-based assembly having miter and non-miter connection regions, namely a miter, a pad and a flat joint structure, made in accordance with at least the first embodiment of the present mirror-based assembly invention.

The first preferred embodiment of the mirror-based assembly is depicted in FIGS. 1-3, showing the mirror panel (10) having a first connection region (20), a second connection region (30) and a third connection region (40). In this first embodiment showing a single mirror panel as an example, the first connection region has a miter structure (20), the second region has a pad structure (30) and the third region has a flat structure (40). In FIG. 3 the mirror panel (10) is assembled within the mirror-based assembly to the support member (50).

Figure 4:
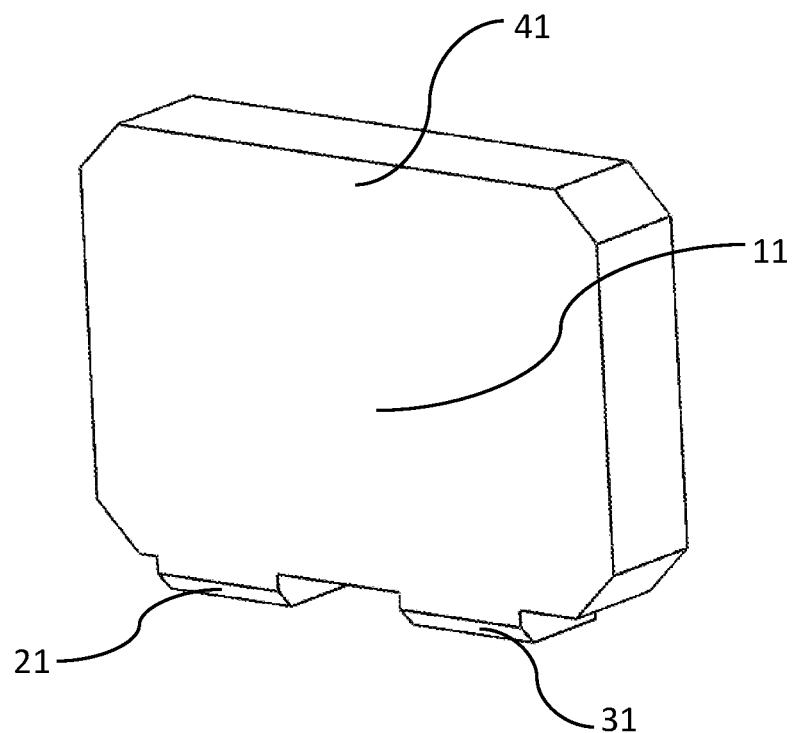
FIG. 4 is a perspective view of a mirror of a mirror-based assembly having miter and non-miter connection regions, namely two miters, and a flat joint structure, made in accordance with at least the second embodiment of the present mirror-based assembly invention.
Figure 5:
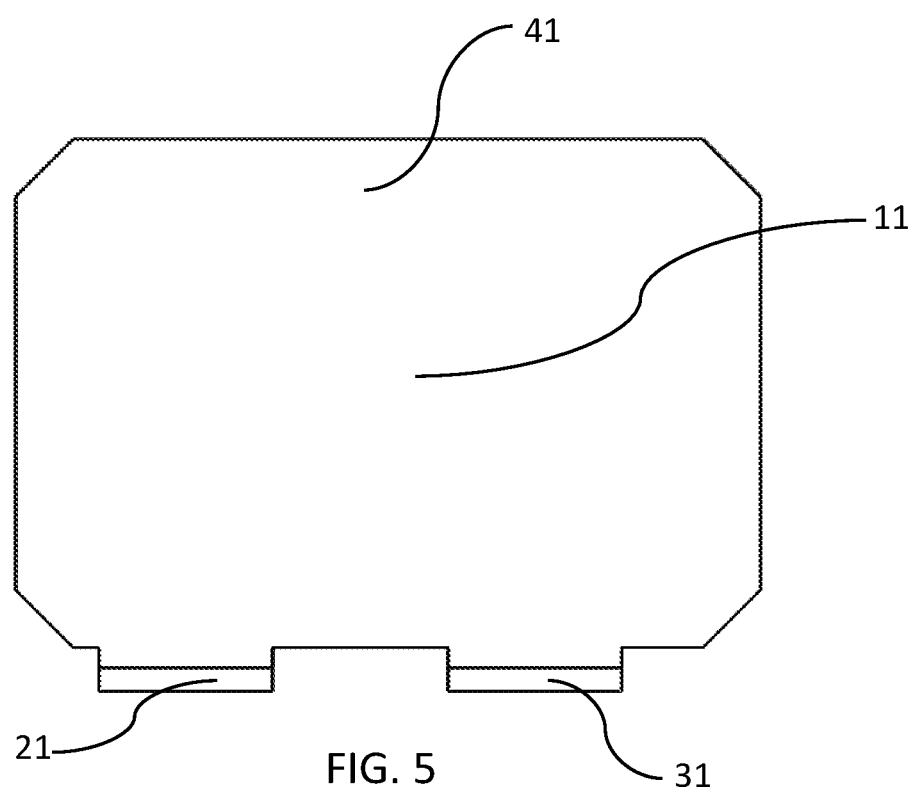
FIG. 5 is a front elevational view of FIG. 4.
Figure 6:
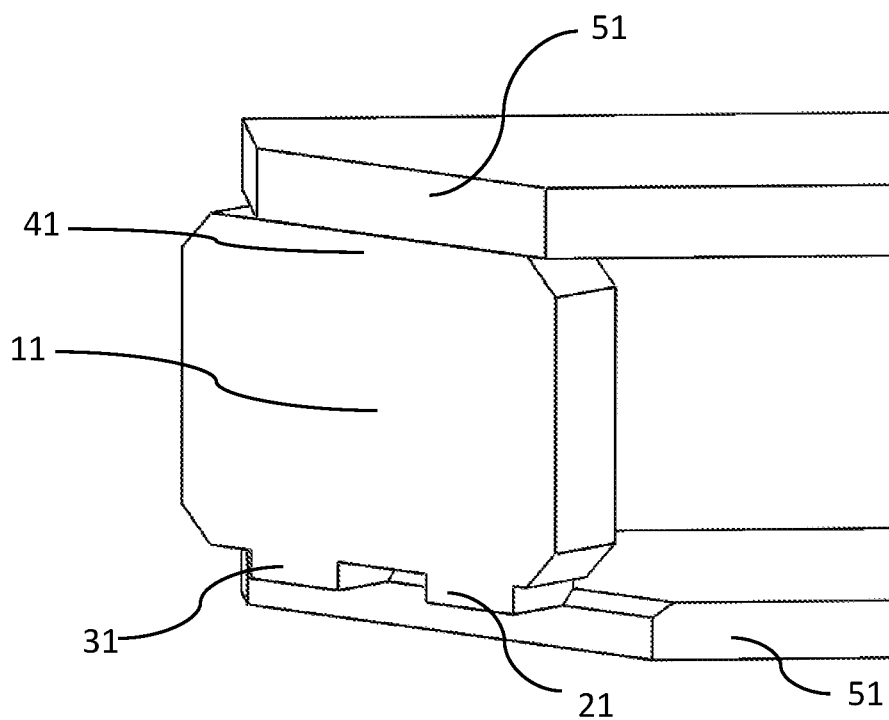
FIG. 6 is a perspective view of a mirror-based assembly having miter and non-miter connection regions, namely two miters, and a flat joint structure, made in accordance with at least the second embodiment of the present mirror-based assembly invention.

The second preferred embodiment of the mirror-based assembly is depicted in FIGS. 4-6, showing the mirror panel (11) having a first connection region (21), a second connection region (31) and a third connection region (41). In this second embodiment of a mirror-based assembly, there are two connection regions having a miter structures (21,31), and the third region has a flat structure (41). In FIG. 6 the mirror panel is assembled within the mirror-based assembly to the support member (51).

Figure 7:
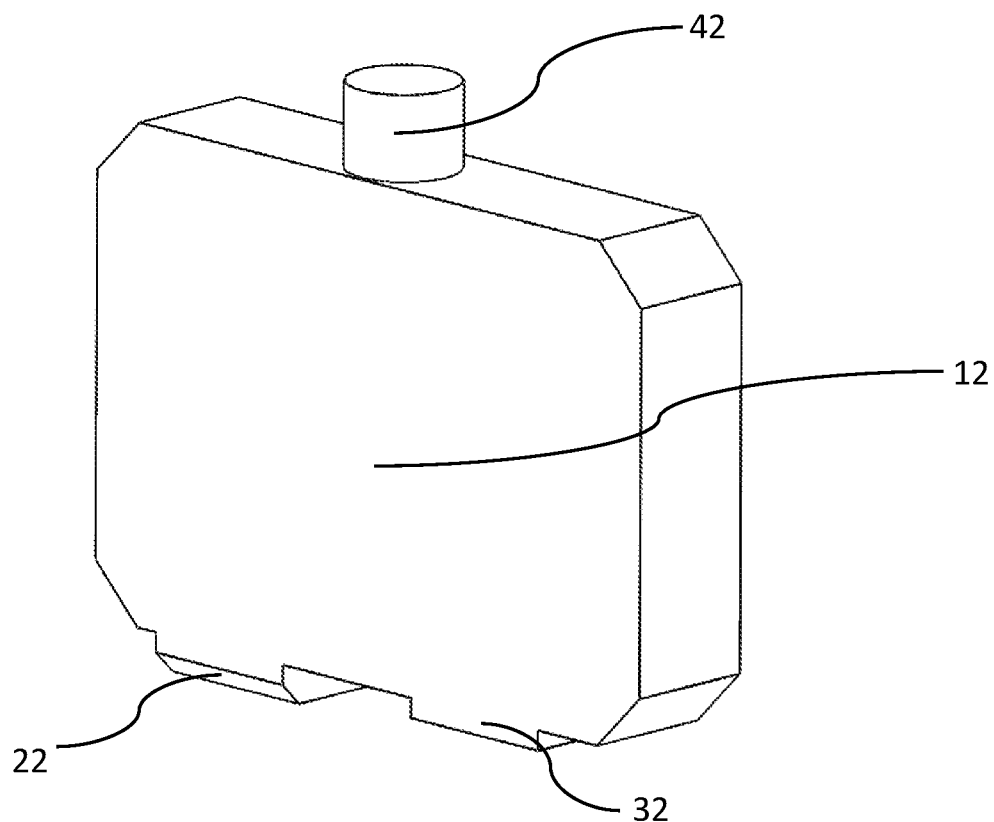
FIG. 7 is a perspective view of a mirror of a mirror-based assembly having miter and non-miter connection regions, namely a miter, a pad and a pin joint structure, made in accordance with at least the third embodiment of the present mirror-based assembly invention.
Figure 8:
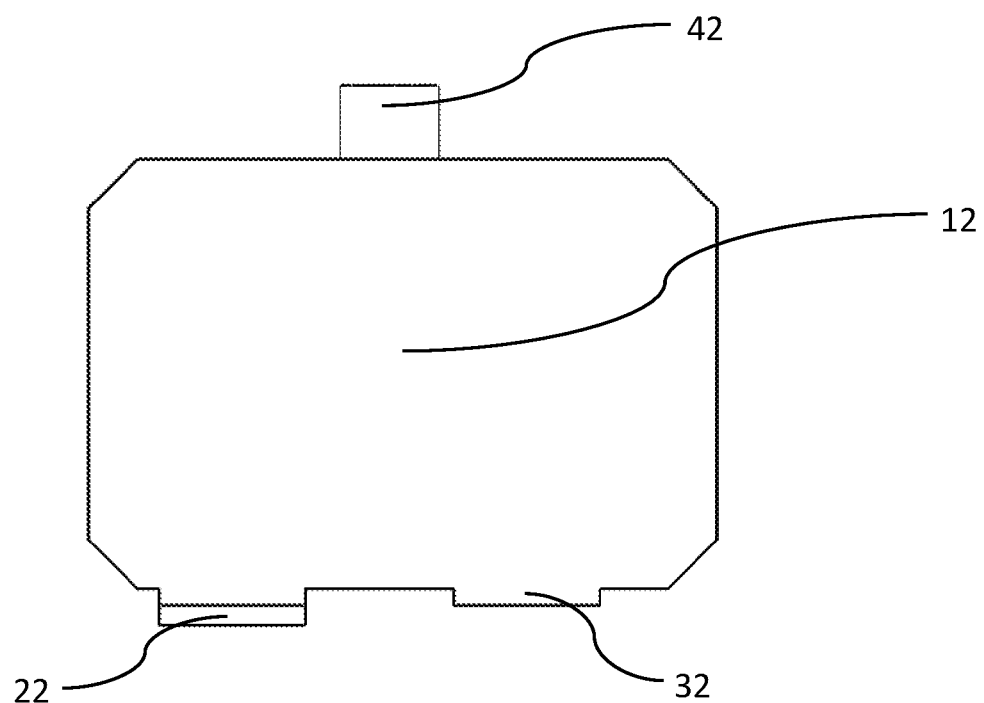
FIG. 8 is a front elevational view of FIG. 7.
Figure 9:
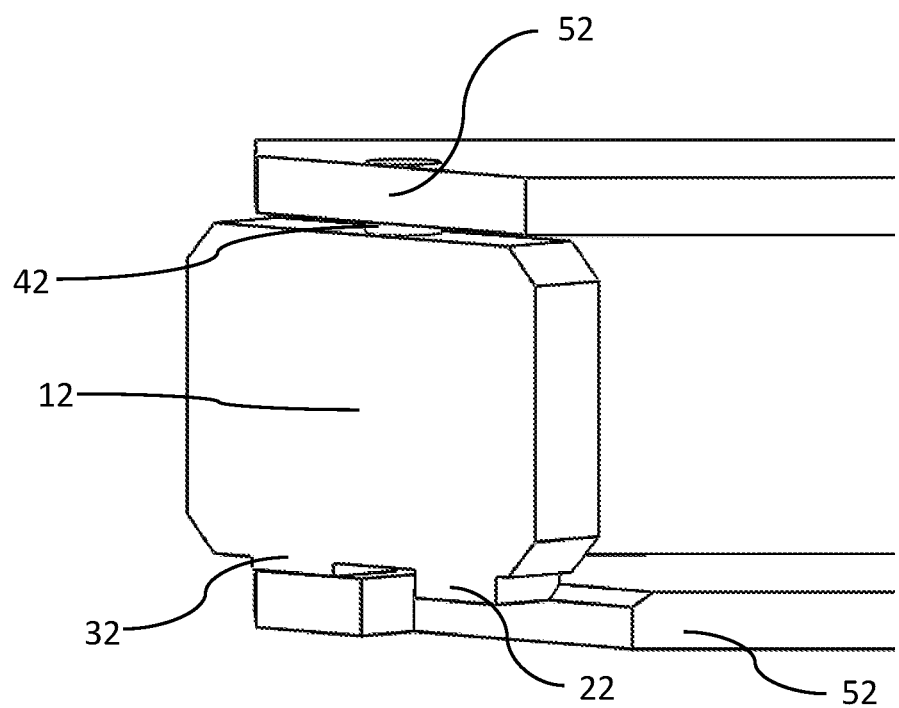
FIG. 9 is a perspective view of a mirror-based assembly having miter and non-miter connection regions, namely a miter, a pad and a pin joint structure, made in accordance with at least the third embodiment of the present mirror-based assembly invention.

The third preferred embodiment of the mirror-based assembly is depicted in FIGS. 7-9, showing the mirror panel (12) having a first connection region (22), a second connection region (32) and a third connection region (42). In this third embodiment of a mirror-based assembly, the first connection region has a miter structure (22), the second region has a pad structure (32) and the third region has a pin structure (42). In FIG. 9 the mirror panel is assembled within the mirror-based assembly to the support member (52).

Figure 10:
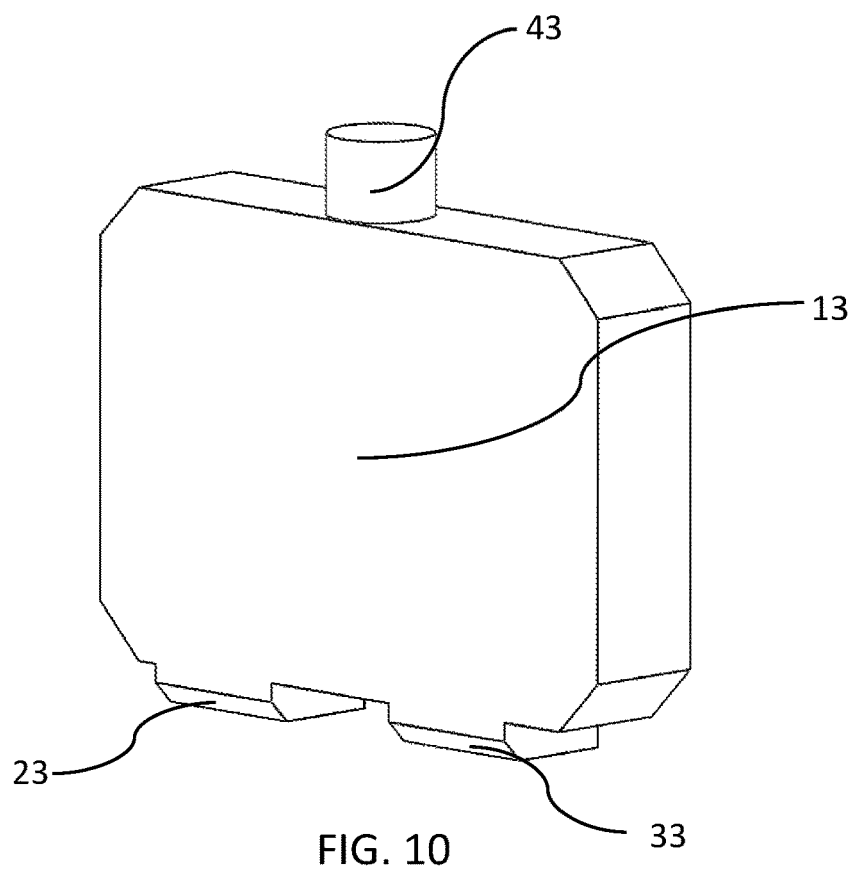
FIG. 10 is a perspective view of a mirror of a mirror-based assembly having miter and non-miter connection regions, namely two miters, and a pin joint structure, made in accordance with at least the fourth embodiment of the present mirror-based assembly invention.
Figure 11:
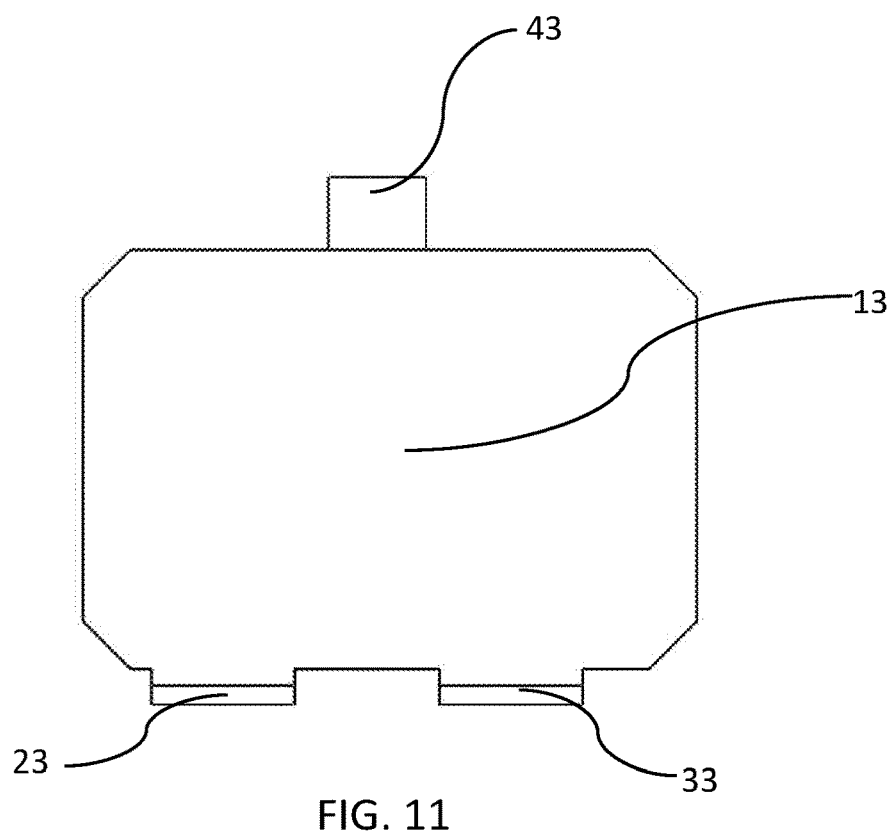
FIG. 11 is a front elevational view of FIG. 10.
Figure 12:
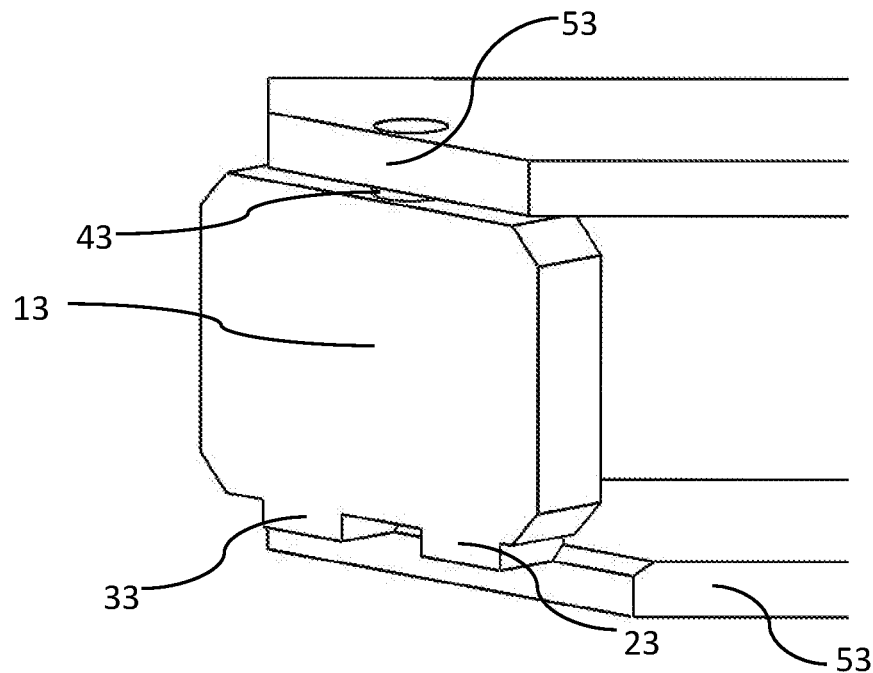
FIG. 12 is a perspective view of a mirror-based assembly having miter and non-miter connection regions, namely two miters, and a pin joint structure, made in accordance with at least the fourth embodiment of the present mirror-based assembly invention.

The fourth preferred embodiment of the mirror-based mirror is depicted in FIGS. 10-12, showing the mirror panel (13) having a first connection region (23), a second connection region (33) and a third connection region (43). In this second embodiment of a mirror-based assembly, there are two connection regions having a miter structures (23,33), and the third region has a pin structure (43). In FIG. 12 the mirror panel is assembled within the mirror-based assembly to the support member (53).

Figure 13:
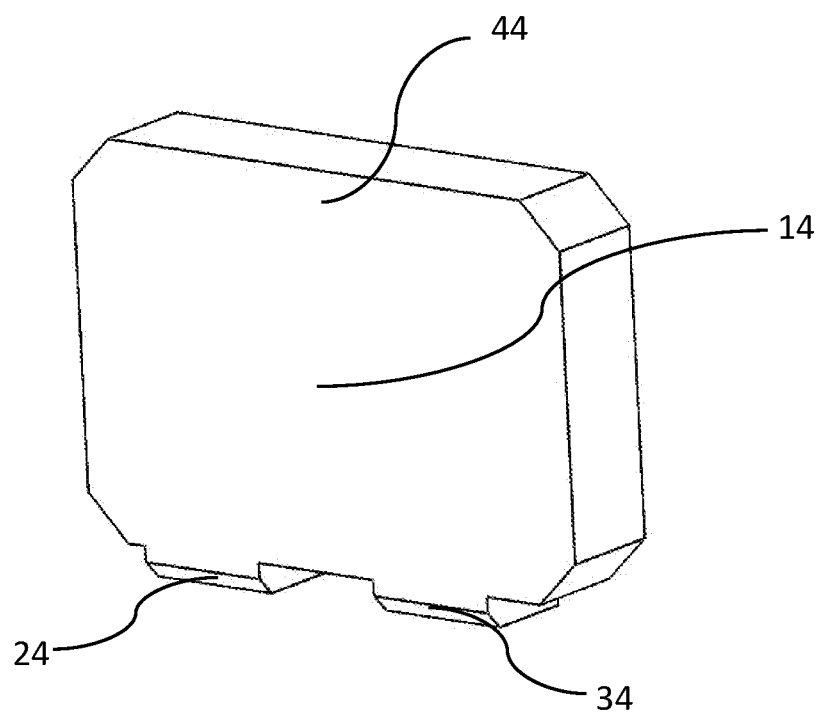
FIG. 13 is a perspective view of a mirror of a mirror-based assembly having miter and non-miter connection regions, namely two miters, and a flat joint structure, made in accordance with at least the fifth embodiment of the present mirror-based assembly invention.
Figure 14:
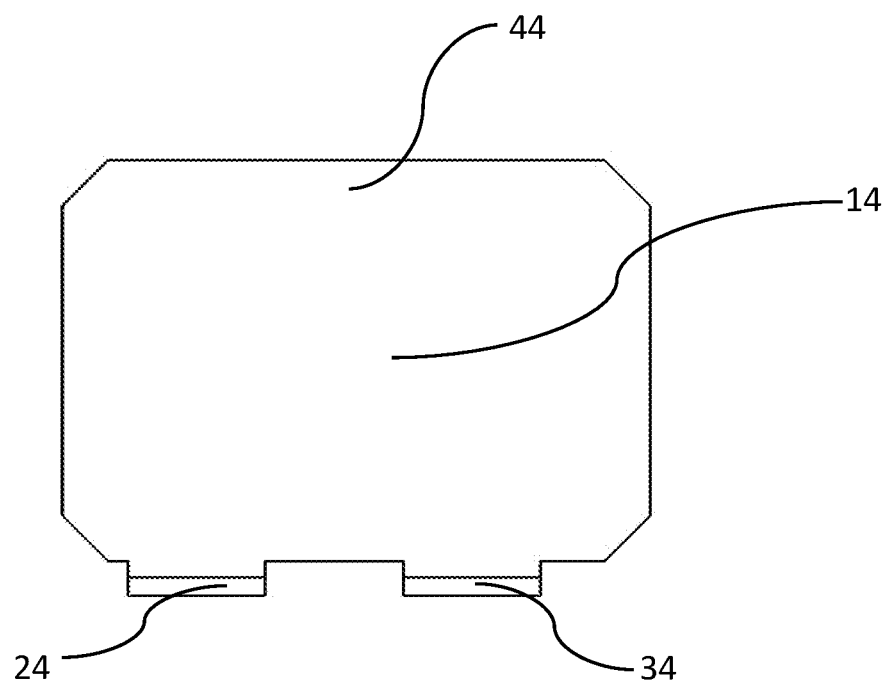
FIG. 14 is a front elevational view of FIG. 13.
Figure 15:
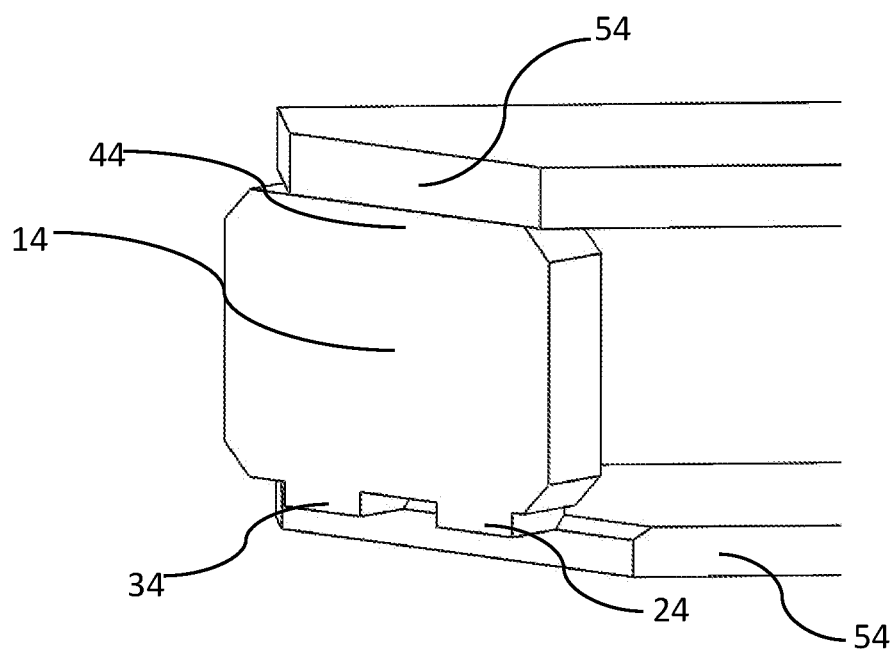
FIG. 15 is a perspective view of a mirror-based assembly having miter and non-miter connection regions, namely two miters, and a flat joint structure, made in accordance with at least the fifth embodiment of the present mirror-based assembly invention.

The fifth embodiment of the mirror-based mirror is depicted in FIGS. 13-15, showing the mirror panel (14) having a first connection region (24), a second connection region (34) and a third connection region (41). In this embodiment of a mirror-based assembly, there are two connection regions having a miter structures (24,34), and the third region has a flat structure (44). In FIG. 15 the mirror panel is assembled within the mirror-based assembly to the support member (54).

Figure 16:
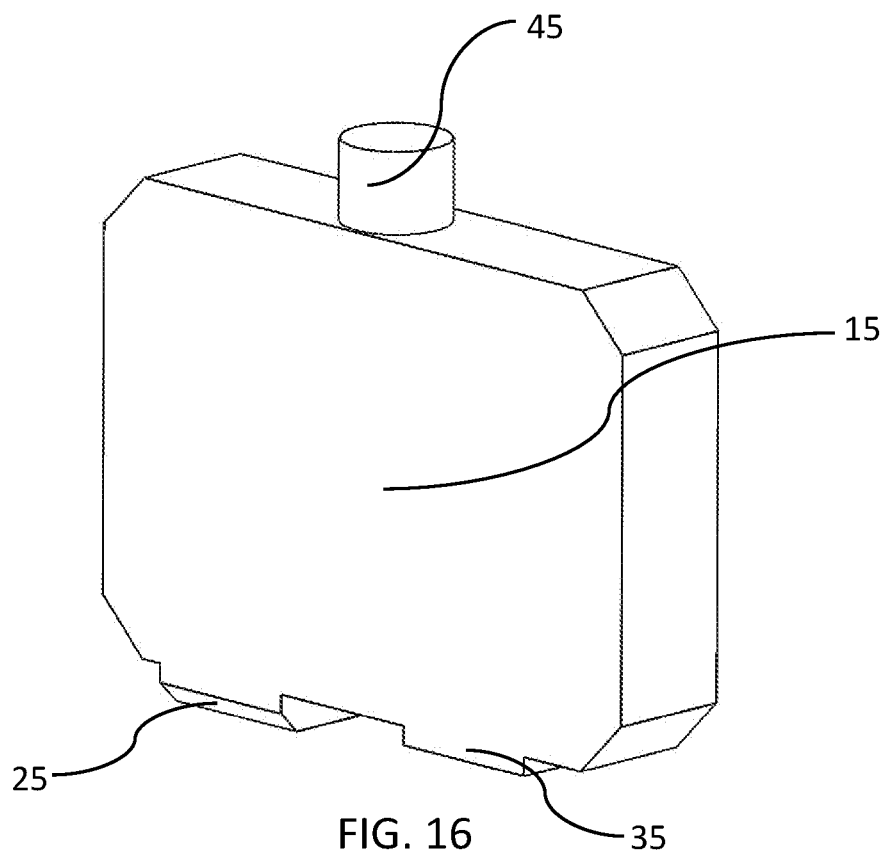
FIG. 16 is a perspective view of a mirror of a mirror-based assembly having miter and non-miter connection regions, namely a miter, a pad and a pin joint structure, made in accordance with at least the sixth embodiment of the present mirror-based assembly invention.
Figure 17:
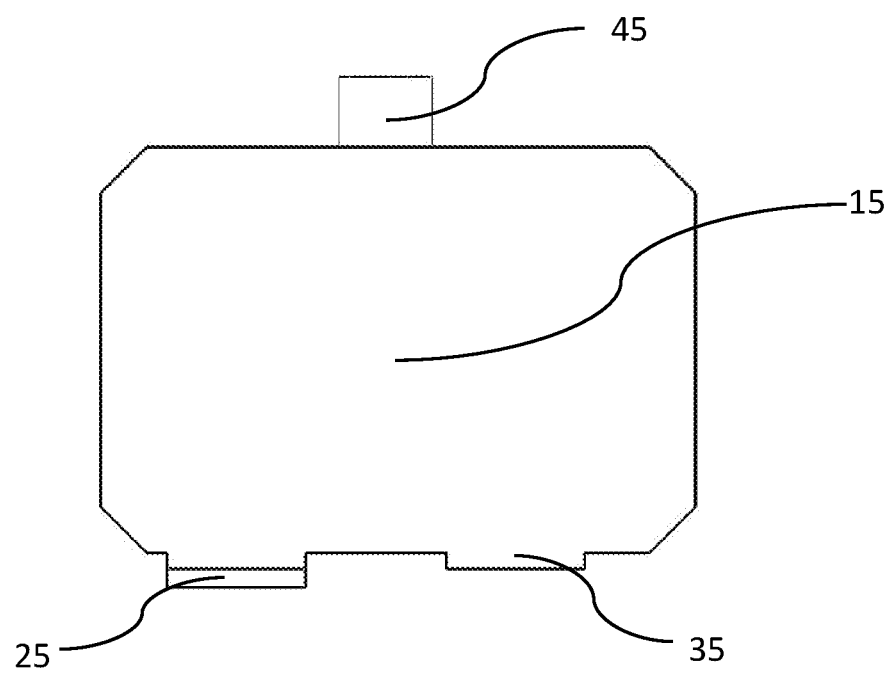
FIG. 17 is a front elevational view of FIG. 16.
Figure 18:
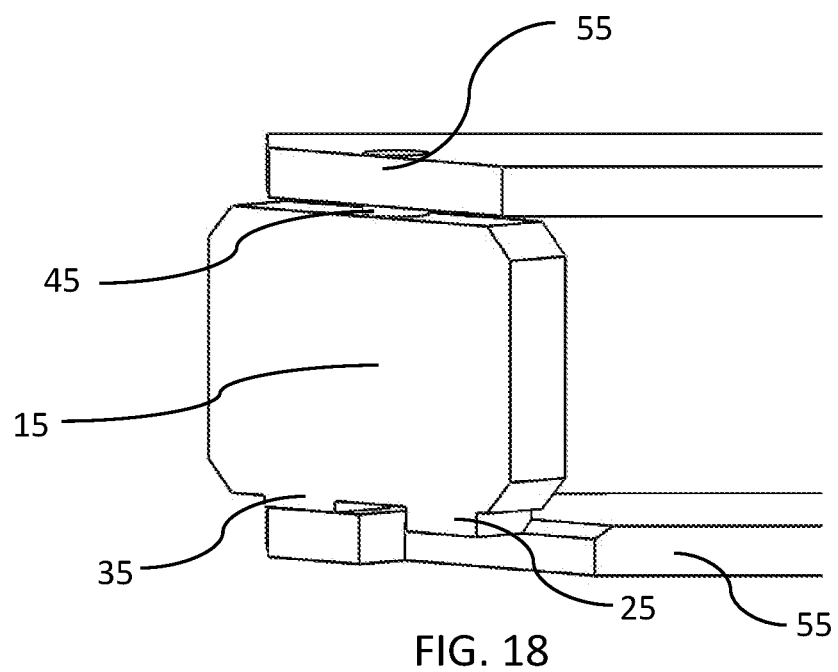
FIG. 18 is a perspective view of a mirror-based assembly having miter and non-miter connection regions, namely a miter, a flat and a pin joint structure, made in accordance with at least the sixth embodiment of the present mirror-based assembly invention.

The sixth preferred embodiment of the mirror-based mirror is depicted in FIGS. 16-18, showing the mirror panel (15) having a first connection region (25), a second connection region (35) and a third connection region (45). In this embodiment showing a single mirror panel as an example, the first connection region has a miter structure (25), the second region has a pad structure (35) and the third region has a pin structure (45). In FIG. 18 the mirror panel is assembled within the mirror-based assembly to the support member (55).

Figure 19:
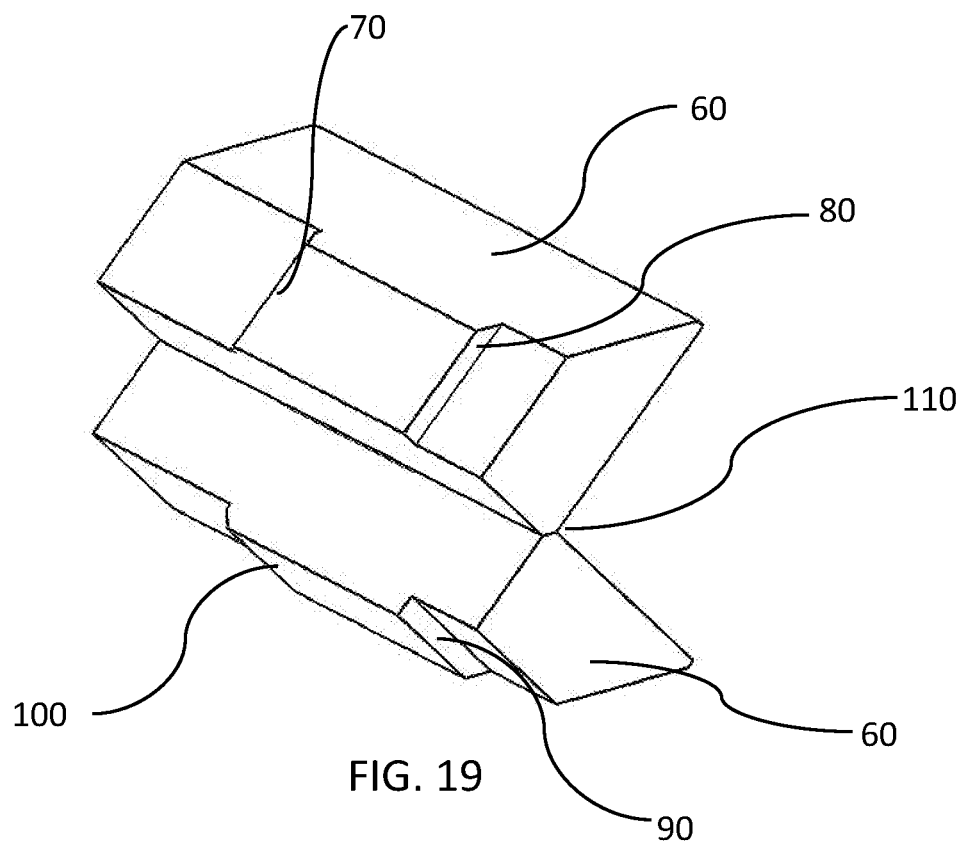
FIG. 19 is a perspective view of a roof mirror of a mirror-based assembly having miter and non-miter connection regions, namely a miter, miter, flat, and flat joint structure, made in accordance with at least the first embodiment of the present roof mirror assembly invention.
Figure 20:
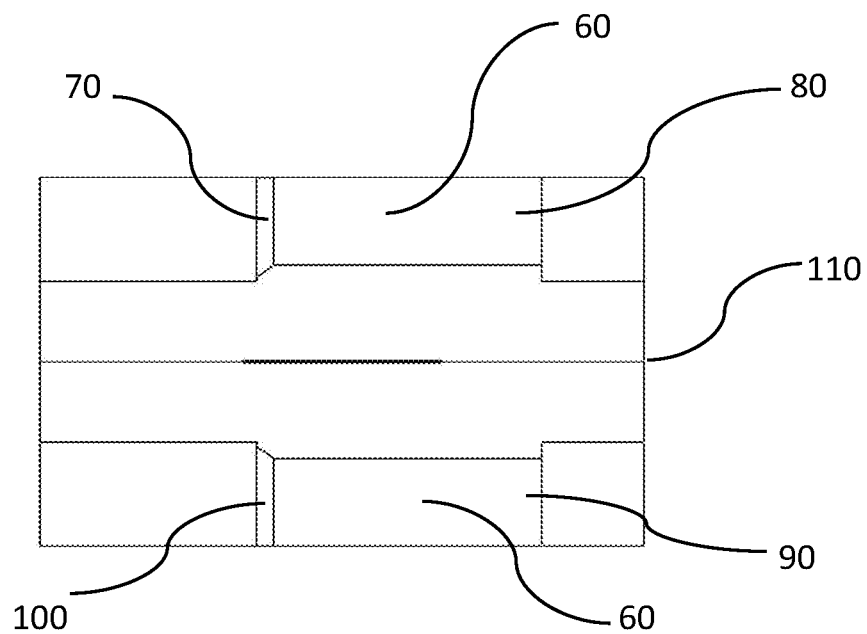
FIG. 20 is a front elevational view of FIG. 19.
Figure 21:
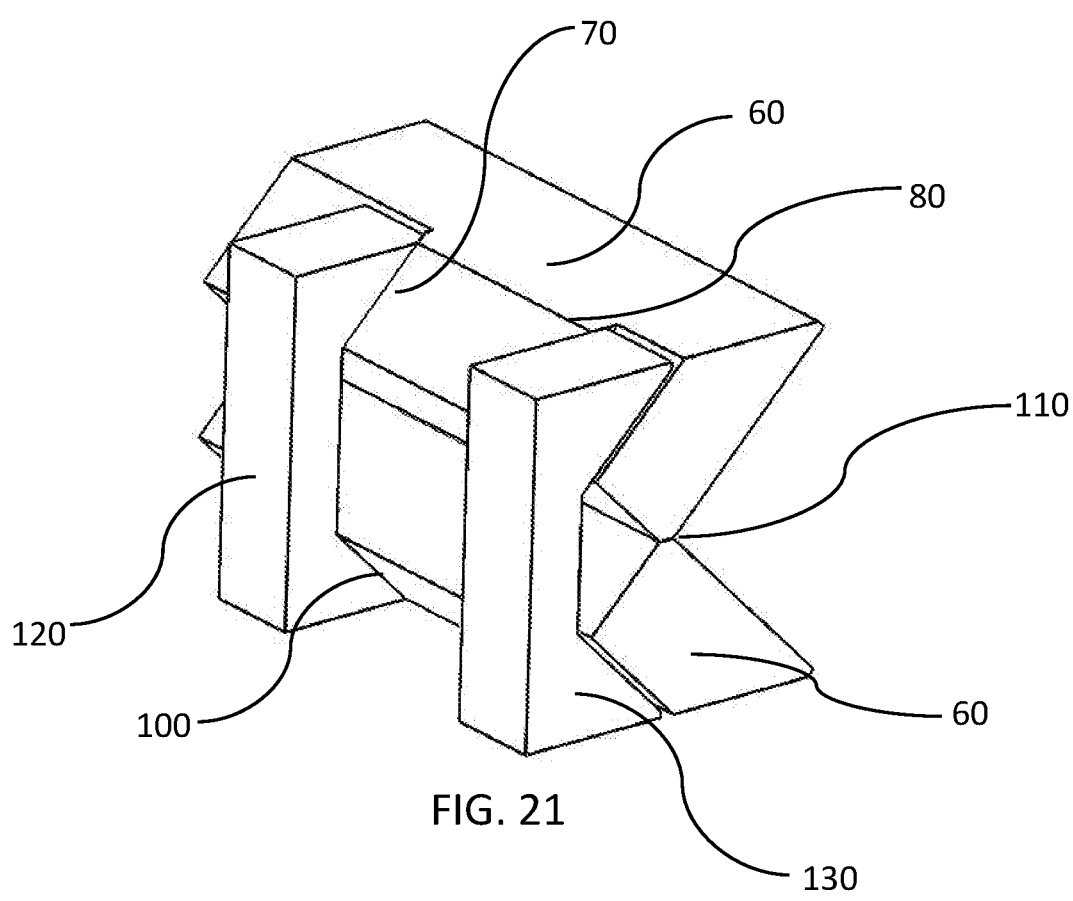
FIG. 21 is a perspective view of a roof mirror of a mirror-based assembly having miter and non-miter connection regions, namely a miter, miter, flat, and flat joint structure, made in accordance with at least the first embodiment of the present roof mirror assembly invention.

One possible example of a mirror-based assembly is a roof mirror assembly. The first preferred embodiment of the roof mirror assembly is depicted in FIGS. 19-21, showing the two mirror panels (60) having a first connection region (70), a second connection region (80), a third connection region (90) and a fourth connection region (100). In this first embodiment showing attachment via two support members as an example, the first connection region has a miter structure (70), the second region has a flat structure (80), the third region has a flat structure (90) and the fourth region has a miter structure (100). In FIG. 21 the roof mirror is assembled to the support members (120,130). The support members can be but is not limited to one of more of the following or any combination thereof, support block, base, housing, optical platform, monolithic structure, mirror, prism, retroreflector and lateral transfer hollow retroreflector. The connection regions can be an interfacing surface or a variety of interfacing surfaces in multiple directions having a miter or non-miter mating joint structure.

Furthermore, in this first preferred embodiment, the support members are two V-shaped support members (120,130), where the connection region is within a smaller portion of the support member to mirror panel interface. Full or larger contact connection regions may be required for some applications for rigidity, but smaller regions prevent over-constraining the mechanics and better performance in thermal expansion and contraction. If a large region is utilized versus a smaller region, the mounting region is fully constrained together, basically both sides of the mounting are fixed together at the interface. Therefore, with a large interface region although secure, when under stress or temperature changes, there is nowhere for the material to go causing a buildup of mechanical stresses and deformations. As a result, having multiple smaller regions of connections may be advantageous for stress reliving, causing higher optical performance of the mirror-based assembly. Additionally, other miter or non-miter structures can be utilized amongst the mirror panels, such as the miter structure (110) shown between the two mirror panels of the roof mirror in FIG. 21.

Figure 22:
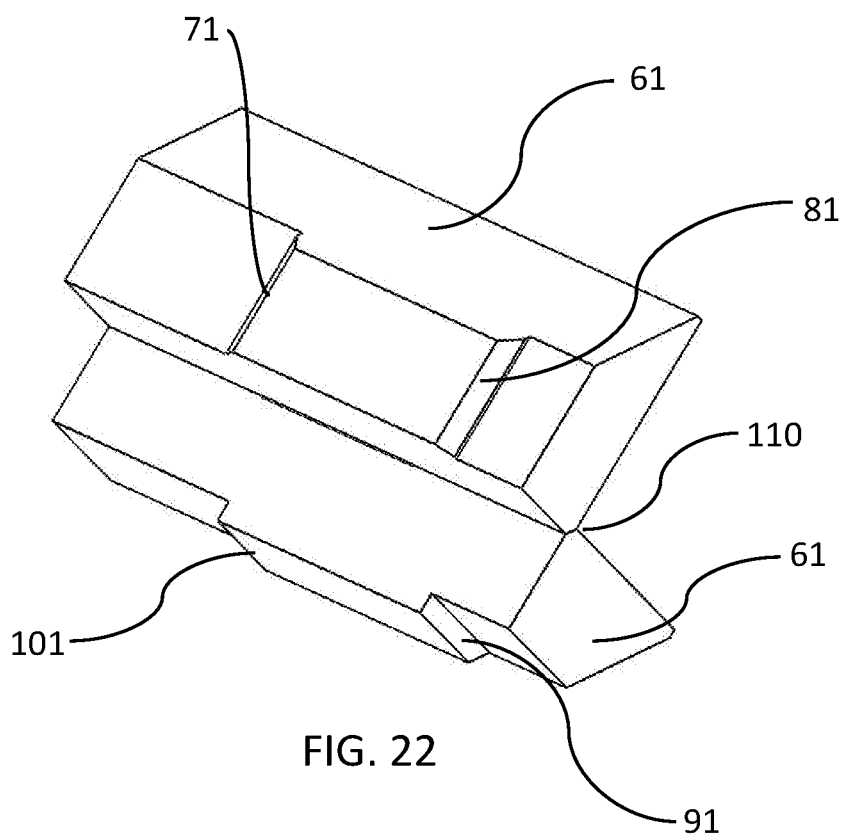
FIG. 22 is a perspective view of a roof mirror of a mirror-based assembly having miter and non-miter connection regions, namely a miter, flat, miter, and flat joint structure, made in accordance with at least the second embodiment of the present roof mirror assembly invention.
Figure 23:
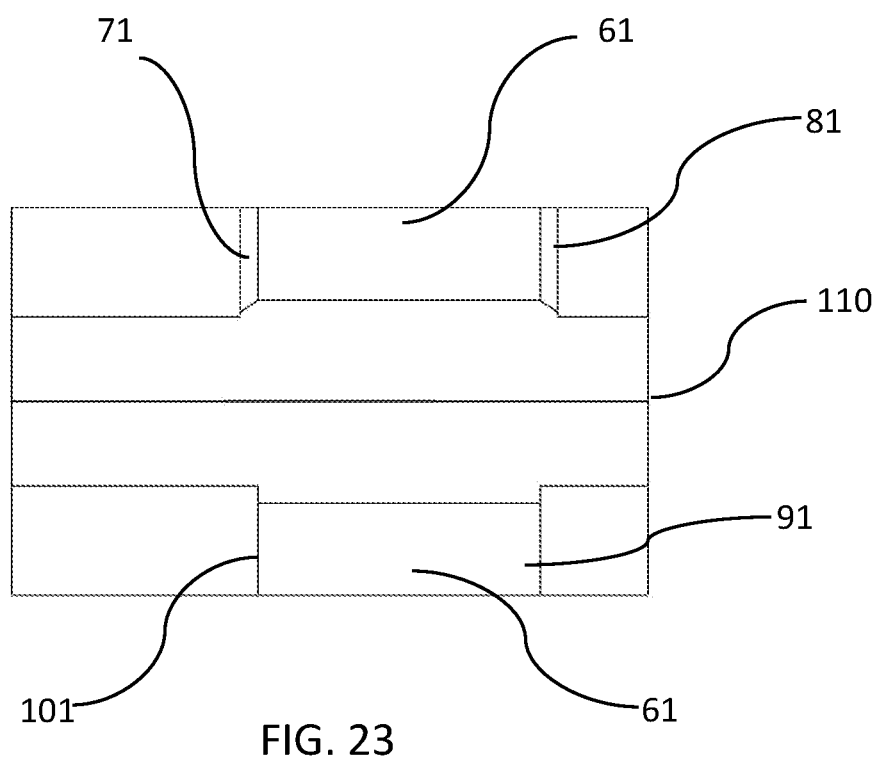
FIG. 23 is a front elevational view of FIG. 22.
Figure 24:
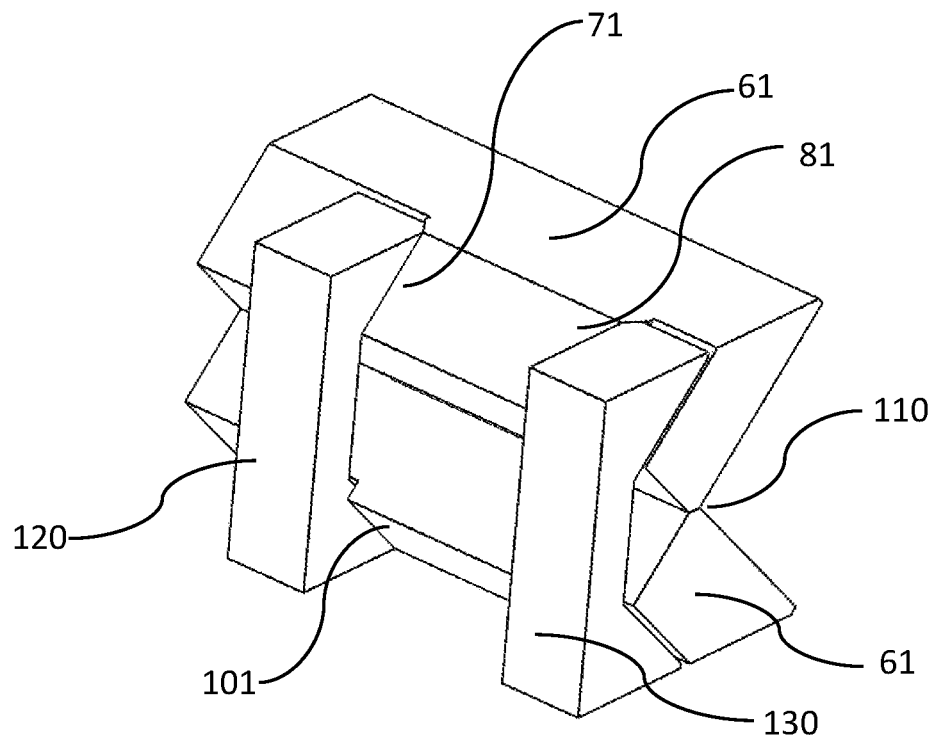
FIG. 24 is a perspective view of a roof mirror of a mirror-based assembly having miter and non-miter connection regions, namely a miter, flat, miter, and flat joint structure, made in accordance with at least the second embodiment of the present roof mirror assembly invention.

The second preferred embodiment of the roof mirror assembly is depicted in FIGS. 22-24, showing the two mirror panels (61) having a first connection region (71), a second connection region (81), a third connection region (91) and a fourth connection region (101). In this second embodiment showing attachment via two support members as an example, the first connection region has a miter structure (71), the second region has a miter structure (81), the third region has a flat structure (91) and the fourth region has a flat structure (101). In FIG. 24 the roof mirror is assembled to the support members (120,130).

Figure 25:
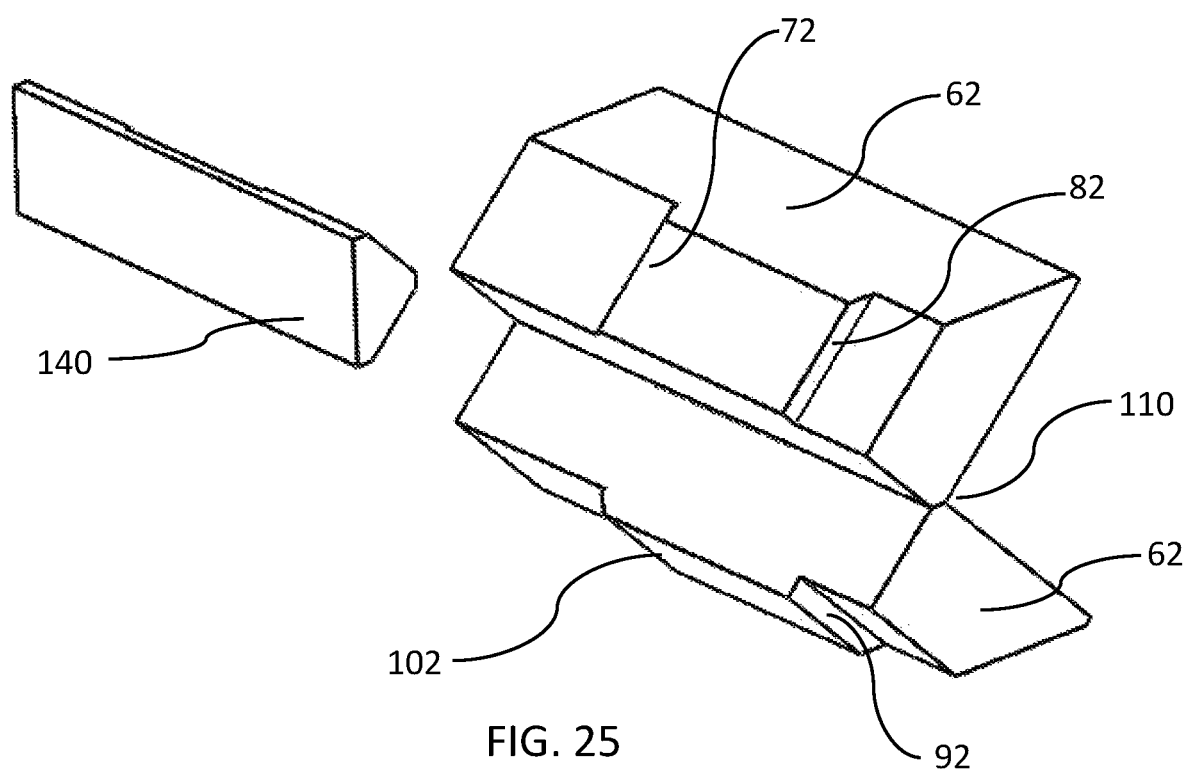
FIG. 25 is a perspective view of a roof mirror and support member of an unassembled mirror-based assembly having miter and non-miter connection regions, namely a miter, miter, flat, and flat joint structure, and having three support members, made in accordance with at least the third embodiment of the present roof mirror assembly invention.
Figure 26:
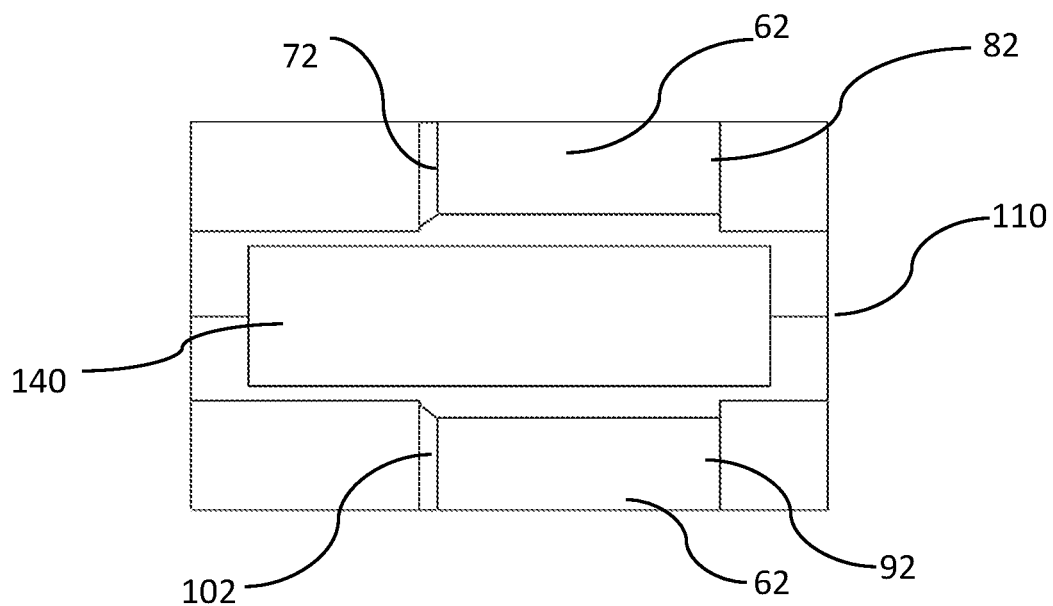
FIG. 26 is a front elevational view of FIG. 25.
Figure 27:
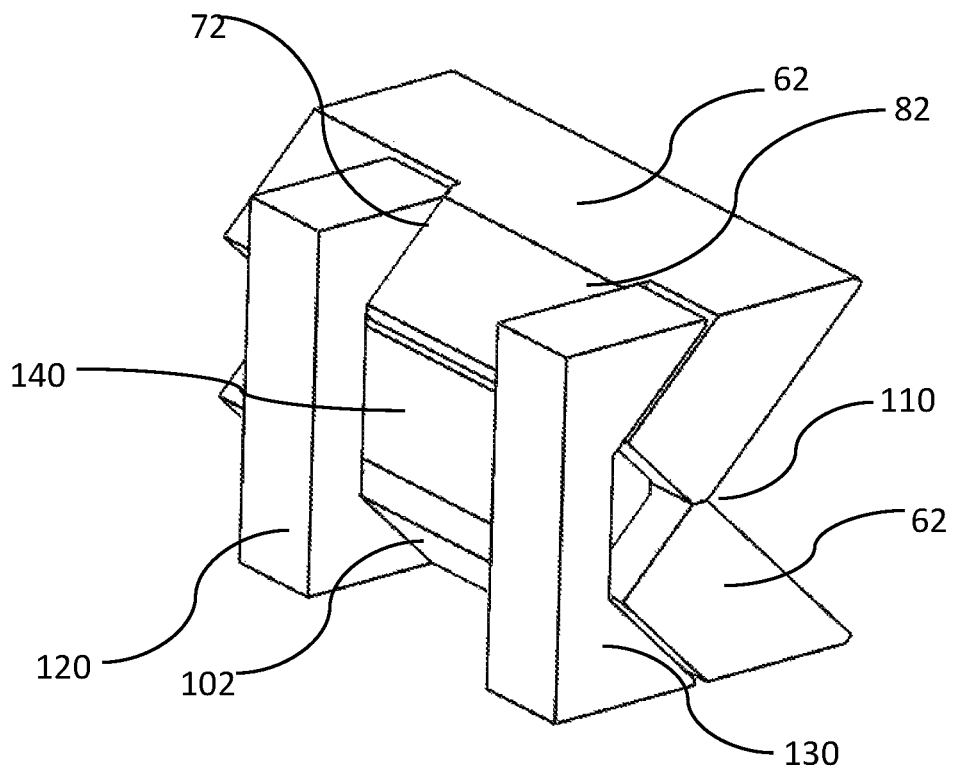
FIG. 27 is a perspective view of a roof mirror of a mirror-based assembly having miter and non-miter connection regions, namely a miter, miter, flat, and flat joint structure, and having three support members, made in accordance with at least the third embodiment of the present roof mirror assembly invention.

The third preferred embodiment of the roof mirror assembly is depicted in FIGS. 25-27, showing the two mirror panels (62) having a first connection region (72), a second connection region (82), a third connection region (92) and a fourth connection region (102). In this third embodiment showing attachment via three support member as an example, the first connection region has a miter structure (72), the second region has a flat structure (82), the third region has a flat structure (92) and the fourth region has a miter structure (102). In FIG. 27 the roof mirror is assembled to the support members (120,130). The support member (140) indicated is a triangular shape as an example but can be any multitude of shapes or configuration utilizing any combination of miter and/or non-miter connection regions, and may also provide for recessed regions to minimize contact regions for stress relieving.

Figure 28:
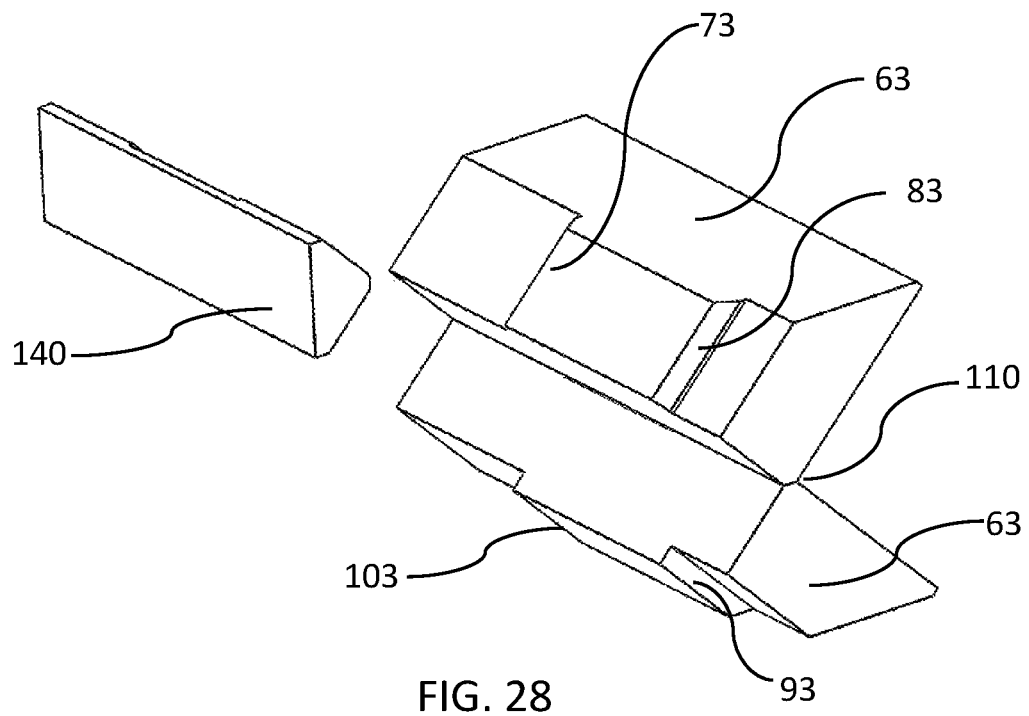
FIG. 28 is a perspective view of a roof mirror and support member of an unassembled mirror-based assembly having miter and non-miter connection regions, namely a miter, flat, miter, and flat joint structure, and having three support members, made in accordance with at least the fourth embodiment of the present roof mirror assembly invention.
Figure 29:
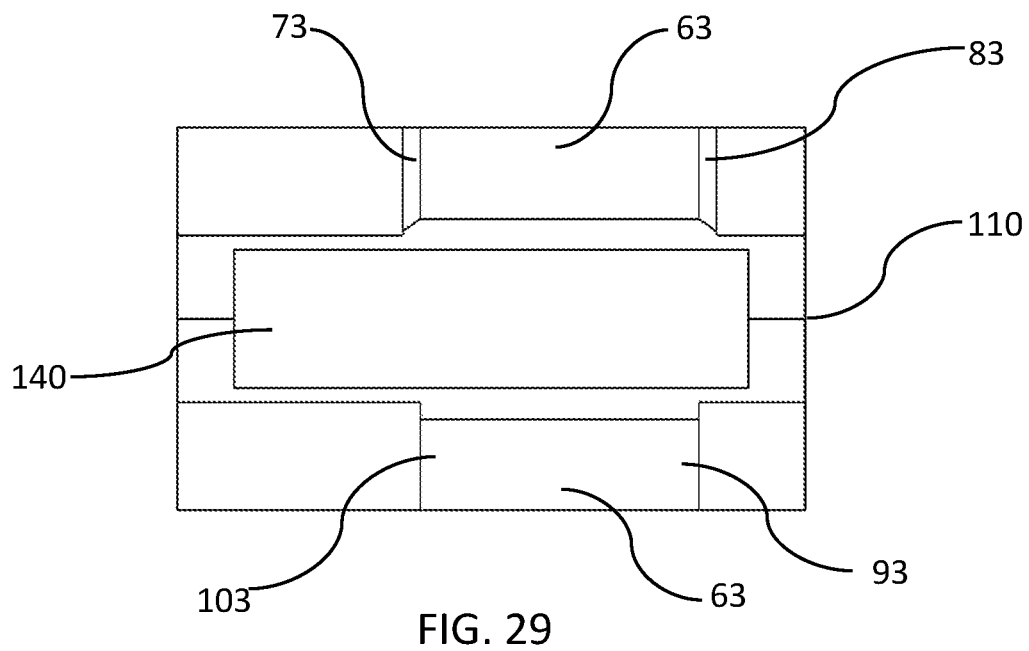
FIG. 29 is a front elevational view of FIG. 28.
Figure 30:
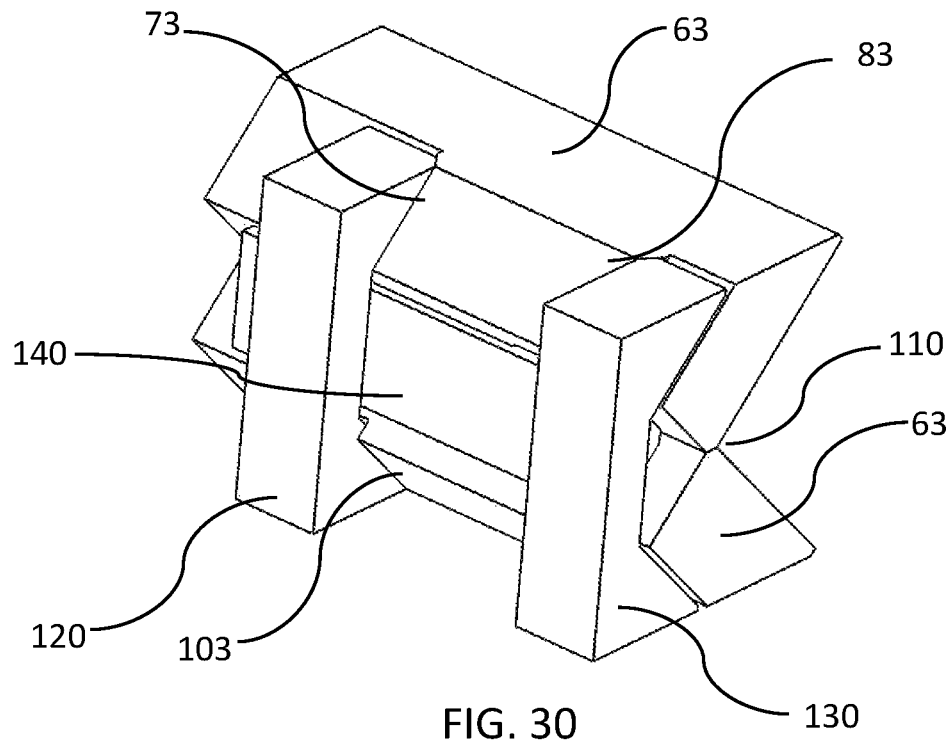
FIG. 30 is a perspective view of a roof mirror of a mirror-based assembly having miter and non-miter connection regions, namely a miter, flat, miter, and flat joint structure, and having three support members, made in accordance with at least the fourth embodiment of the present roof mirror assembly invention.

The fourth preferred embodiment of the roof mirror assembly is depicted in FIGS. 28-30, showing the two mirror panels (63) having a first connection region (73), a second connection region (83), a third connection region (93) and a fourth connection region (103). In this fourth embodiment showing attachment via three support member as an example, the first connection region has a miter structure (73), the second region has a miter structure (83), the third region has a flat structure (93) and the fourth region has a flat structure (103). In FIG. 30 the roof mirror is assembled to the support members (120,130).

Figure 31:
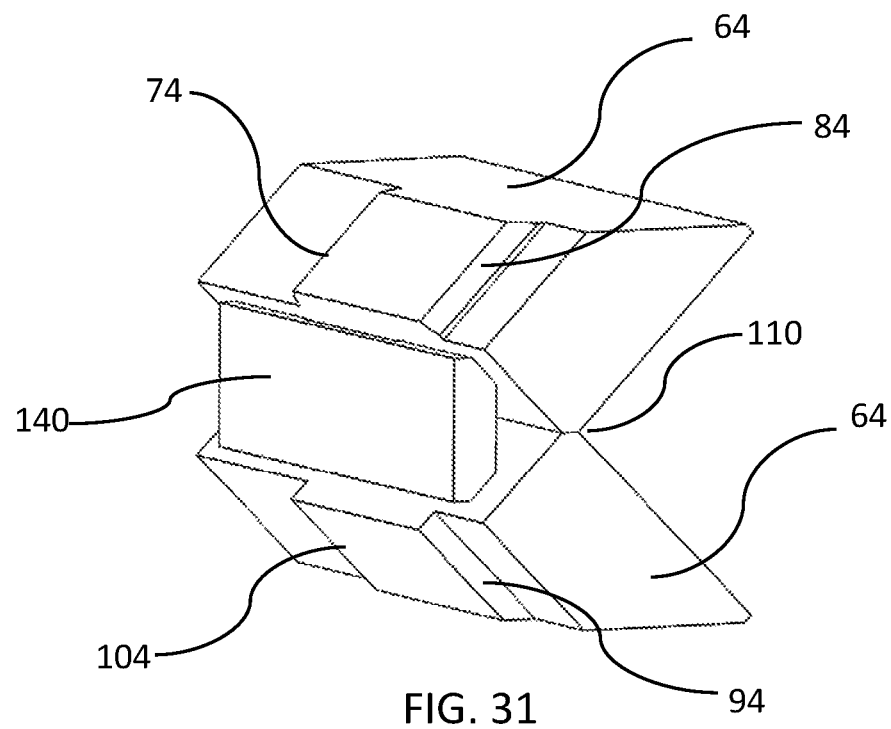
FIG. 31 is a perspective view of a first embodiment of a third support member for a roof-mirror of a mirror-based assembly.
Figure 32:
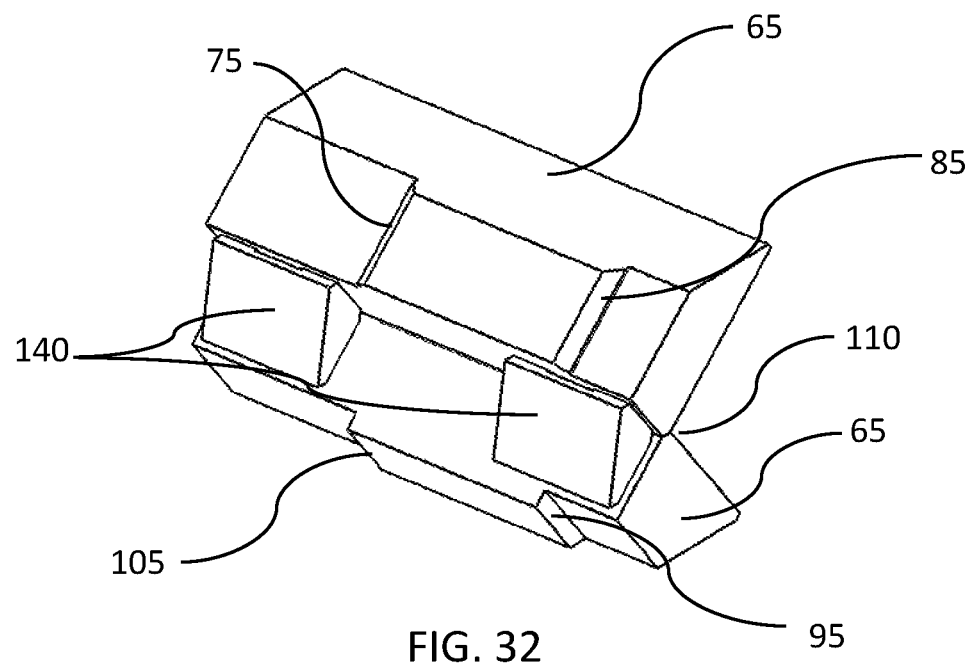
FIG. 32 is a perspective view of a second embodiment of a third support member for a roof-mirror of a mirror-based assembly.
Figure 33:
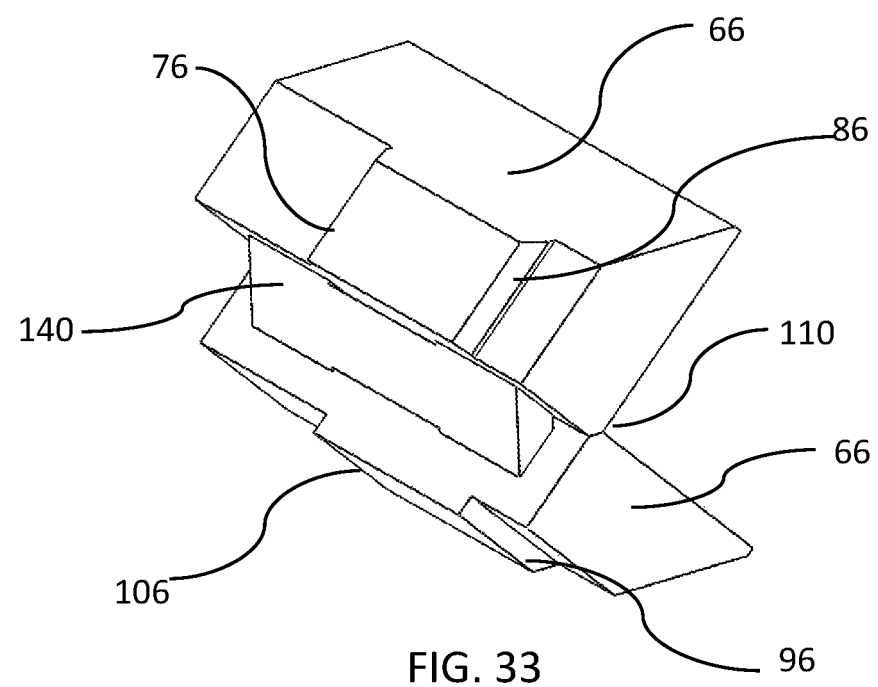
FIG. 33 is a perspective view of a third embodiment of a third support member for a roof-mirror of a mirror-based assembly.

For the third support member of the roof mirror assembly, there can be multiple embodiments, as shown in FIGS. 31, 32 and 33. In FIG. 31, the support member (140) is a trapezoidal shape with miter connection regions. In FIG. 32, there are multiple support members (140), such that any single support member can be further divided into multiple elements. In FIG. 33, there is a smaller support (140) showing different scales of options. Also, of note in FIG. 33, there are recessed areas or notches within the support structure, which is another way to achieve or limit the connection region if necessary. Furthermore, there can more than three support members such as but not limited to four, two perpendicular to another two, or the third triangular in multiple sections.

Figure 34:
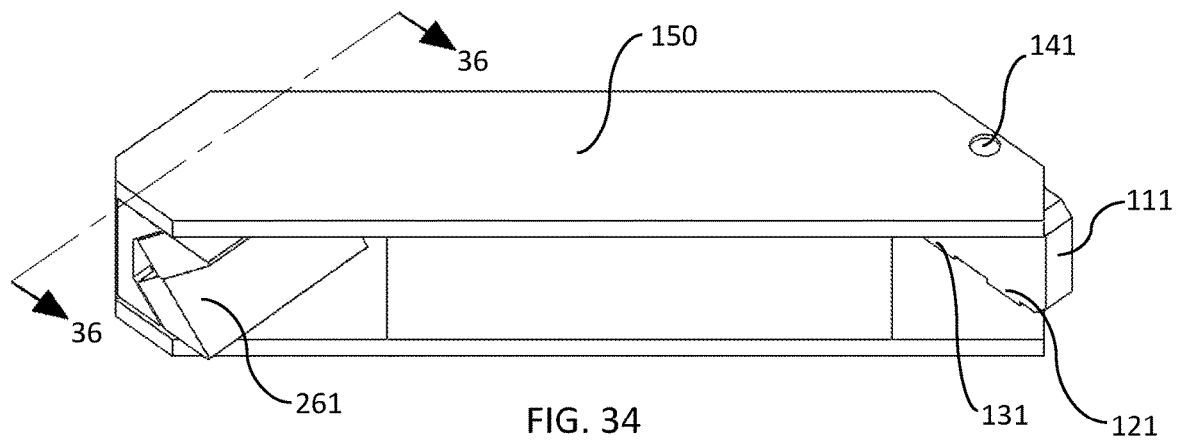
FIG. 34 is a perspective view of a mirror-based assembly with miter and non-miter connection regions, namely, a lateral transfer hollow retroreflector with a roof mirror assembly having a miter, flat, miter and flat joint structure and a flat mirror-based assembly having a pad, pad and pin joint structure, made in accordance with at least the first lateral transfer hollow retroreflector embodiment of the present invention.
Figure 35:
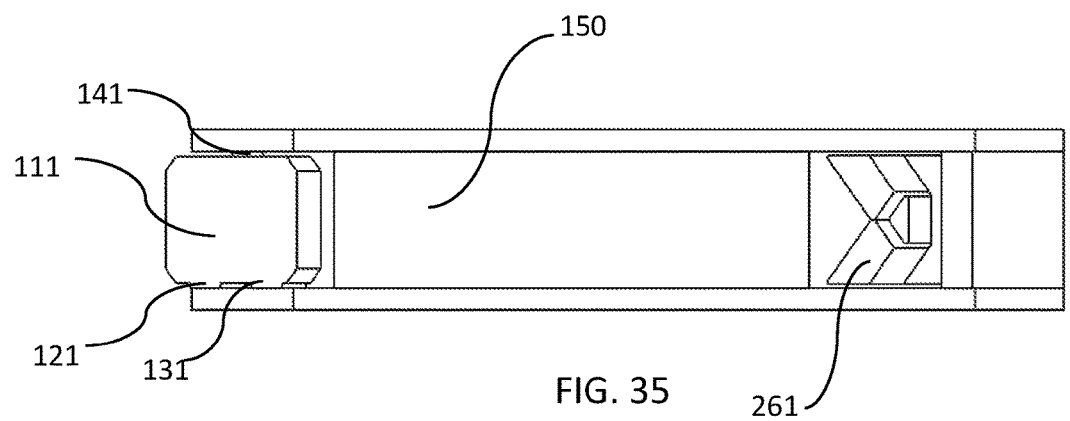
FIG. 35 is a front elevational view of the lateral transfer hollow retroreflector mirror assembly shown in FIG. 34.
Figure 36:
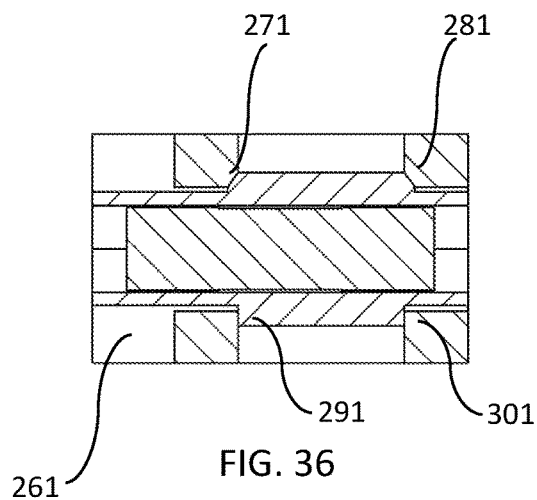
FIG. 36 is a cross-sectional view of the roof mirror shown in the lateral transfer hollow retroreflector mirror assembly of FIGS. 34-35, taken along line 36-36 of FIG. 34.

Another possible example of a mirror-based assembly is a lateral transfer hollow retroreflector (LTHR) assembly. The first preferred embodiment of the lateral transfer hollow retroreflector (150) depicting a mirror-based assembly with miter and non-miter connection regions is depicted in FIGS. 34-36, showing the flat mirror assembly (111) and roof mirror assembly (261). In combination, there are a total of three mirror panels having a first connection region (121), a second connection region (131), a third connection region (141), a fourth connection region (271), a fifth connection region (281), a sixth connection region (291), and a seventh connection region (301). In this first embodiment for a lateral transfer hollow retroreflector showing attachment via several support member as an example, the first connection region has a pad structure (121), the second region has a pad structure (131), the third region has a pin structure (141), the fourth region has a miter structure (271), the fifth region has a miter structure (281), the sixth region has a non-miter, flat structure (291) and the seventh region has a non-miter, flat structure (301).

In the lateral transfer hollow retroreflector, there may be multiple support members or other reinforcements to each or several of the mirror panels. Furthermore, those support members may inherently be part of or directly connected to the main housing structures of the lateral transfer hollow retroreflector. Additionally, there could be additional elements or non-mirror-based optics mounted with any combination of miter and/or non-miter connection regions, including but not limited to lenses, prisms, penta roofs or prisms, beam splitters, filters or additional mirrors. The mirror-based assembly can also be an invariant optical system like the lateral transfer hollow retroreflector, such as a lateral transfer hollow periscope, penta mirror, penta roof or any combination thereof, such that the beam has a known path in and out of the assembly with minimal beam deviation.

Figure 37:
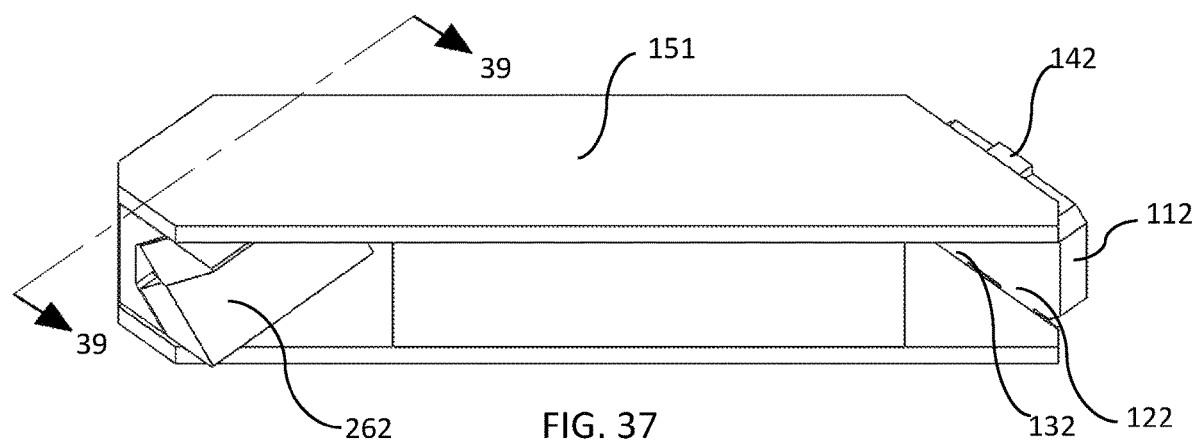
FIG. 37 is a perspective view of a mirror-based assembly with miter and non-miter connection regions, namely, a lateral transfer hollow retroreflector with a roof mirror assembly having a miter, flat, miter and flat joint structure and a flat mirror-based assembly having a three miter joint structure, made in accordance with at least the second lateral transfer hollow retroreflector embodiment of the present invention.
Figure 38:
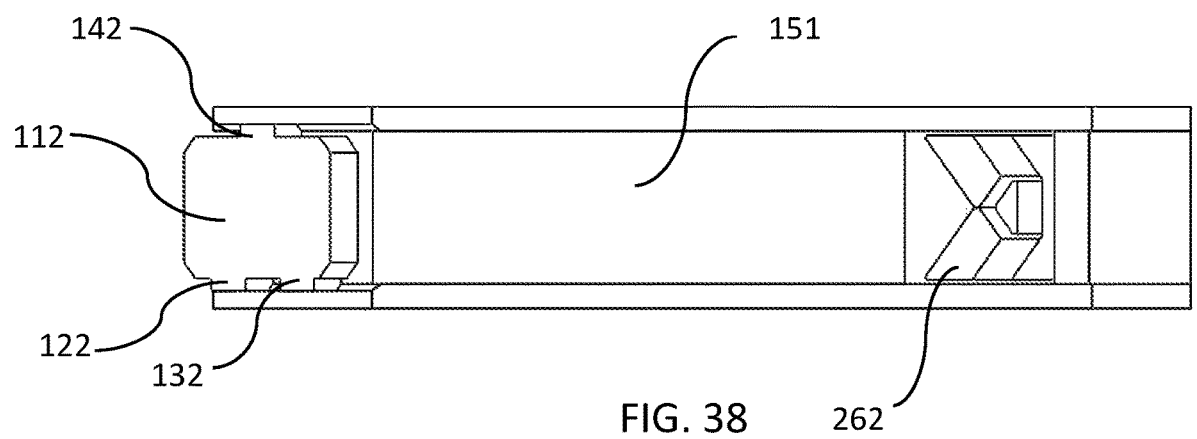
FIG. 38 is a front elevational view of the lateral transfer hollow retroreflector mirror assembly shown in FIG. 37.
Figure 39:
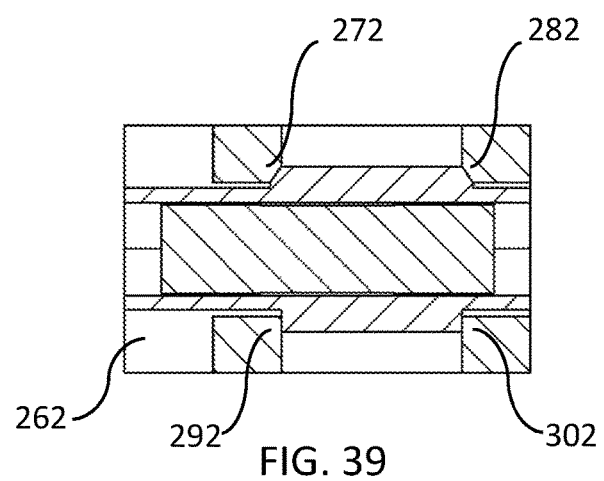
FIG. 39 is a cross-sectional view of the roof mirror shown in the lateral transfer hollow retroreflector mirror assembly of FIGS. 37-38, taken along line 39-39 of FIG. 37.

The second preferred embodiment of the lateral transfer hollow retroreflector (151) depicting a mirror-based assembly with miter and non-miter connection regions is depicted in FIGS. 37-39, showing the flat mirror assembly (112) and roof mirror assembly (262). In combination, there are a total of three mirror panels having a first connection region (122), a second connection region (132), a third connection region (142), a fourth connection region (272), a fifth connection region (282), a sixth connection region (292), and a seventh connection region (302). In this second embodiment for a lateral transfer hollow retroreflector showing attachment via several support member as an example, the first connection region has a miter structure (122), the second region has a miter structure (132), the third region has a miter structure (142), the fourth region has a miter structure (272), the fifth region has a miter structure (282), the sixth region has a flat structure (292) and the seventh region has a flat structure (302).

Figure 40:
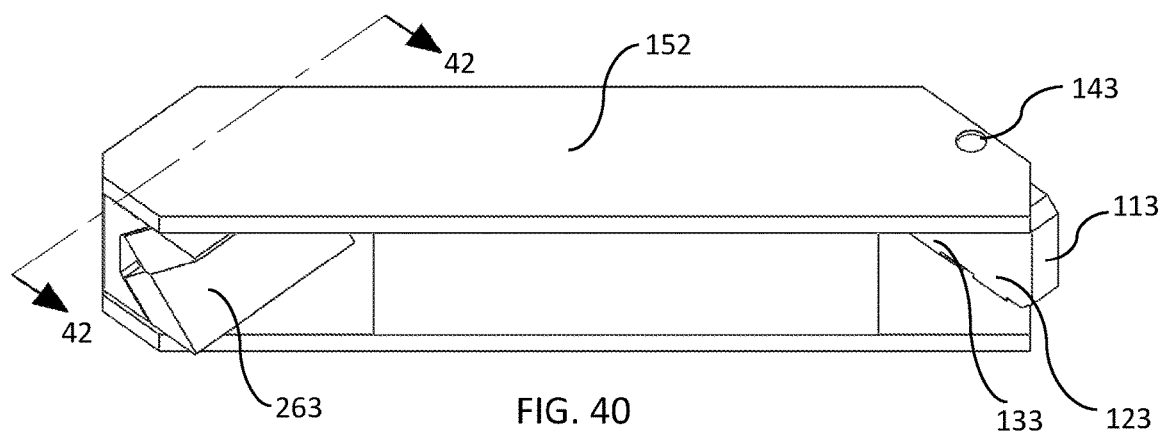
FIG. 40 is a perspective view of a mirror-based assembly with miter and non-miter connection regions, namely, a lateral transfer hollow retroreflector with a roof mirror assembly having a miter, miter, flat and flat joint structure and a flat mirror-based assembly having a miter, a pad and pin joint structure, made in accordance with at least the third lateral transfer hollow retroreflector embodiment of the present invention.
Figure 41:
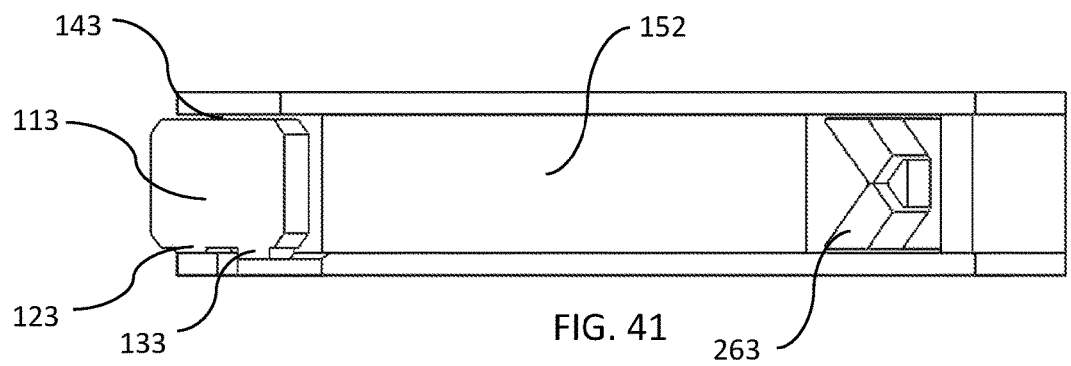
FIG. 41 is a front elevational view of the lateral transfer hollow retroreflector mirror assembly shown in FIG. 40.
Figure 42:
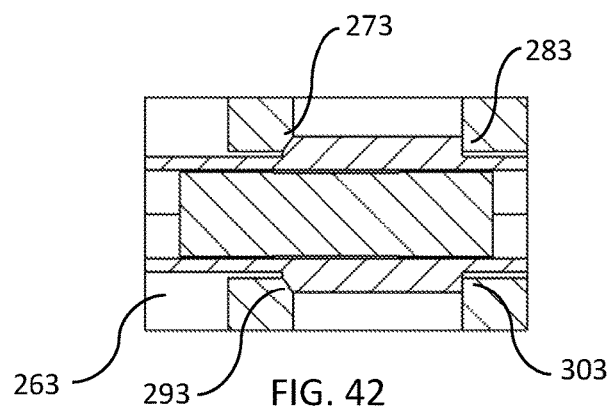
FIG. 42 is a cross-sectional view of the roof mirror shown in the lateral transfer hollow retroreflector mirror assembly of FIGS. 40-41, taken along line 42-42 of FIG. 40.

The third preferred embodiment of the lateral transfer hollow retroreflector (152) depicting a mirror-based assembly with miter and non-miter connection regions is depicted in FIGS. 40-42, showing the flat mirror assembly (113) and roof mirror assembly (263). In combination, there are a total of three mirror panels having a first connection region (123), a second connection region (133), a third connection region (143), a fourth connection region (273), a fifth connection region (283), a sixth connection region (293), and a seventh connection region (303). In this third embodiment for a lateral transfer hollow retroreflector showing attachment via several support member as an example, the first connection region has a pad structure (123), the second region has a miter structure (133), the third region has a pin structure (143), the fourth region has a miter structure (273), the fifth region has a flat structure (283), the sixth region has a miter structure (293) and the seventh region has a flat structure (303).

Figure 43:
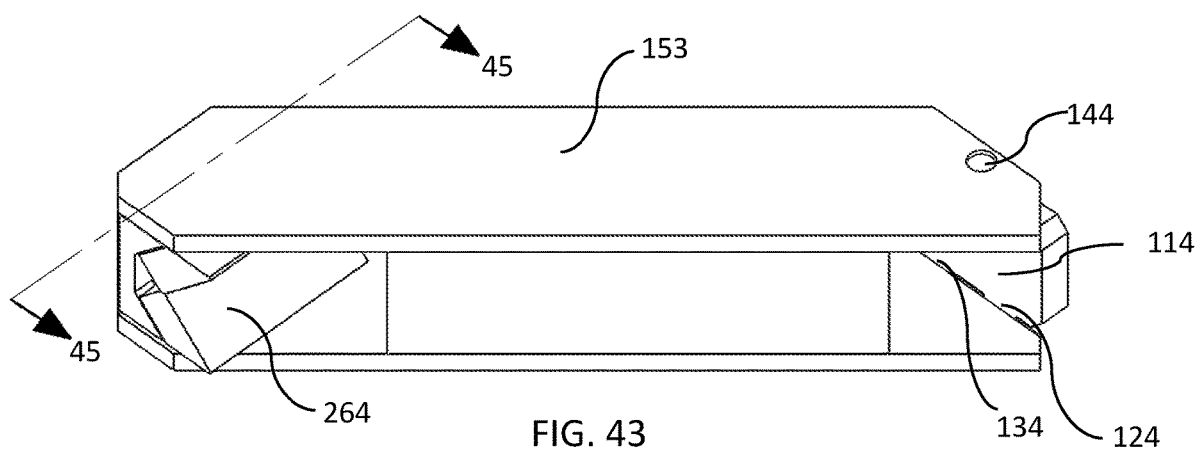
FIG. 43 is a perspective view of a mirror-based assembly with miter and non-miter connection regions, namely, a lateral transfer hollow retroreflector with a roof mirror assembly having a miter, miter, flat and flat joint structure and a flat mirror-based assembly having two miters and pin joint structure, made in accordance with at least the fourth lateral transfer hollow retroreflector embodiment of the present invention.
Figure 44:
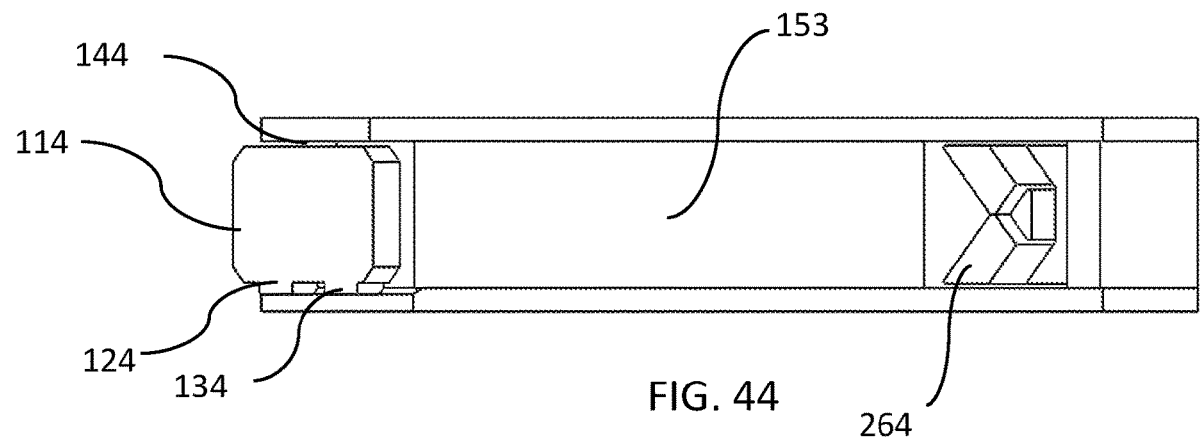
FIG. 44 is a front elevational view of the lateral transfer hollow retroreflector mirror assembly shown in FIG. 43.
Figure 45:
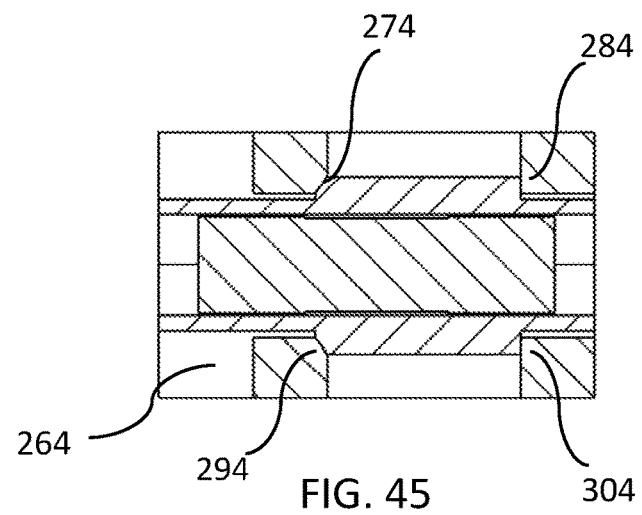
FIG. 45 is a cross-sectional view of the roof mirror shown in the lateral transfer hollow retroreflector mirror assembly of FIGS. 43-44, taken along line 45-45 of FIG. 43.

The fourth preferred embodiment of the lateral transfer hollow retroreflector (153) depicting a mirror-based assembly with miter and non-miter connection regions is depicted in FIGS. 43-45, showing the flat mirror assembly (114) and roof mirror assembly (264). In combination, there are a total of three mirror panels having a first connection region (124), a second connection region (134), a third connection region (144), a fourth connection region (274), a fifth connection region (284), a sixth connection region (294), and a seventh connection region (304). In this fourth embodiment for a lateral transfer hollow retroreflector showing attachment via several support member as an example, the first connection region has a miter structure (124), the second region has a miter structure (134), the third region has a pin structure (144), the fourth region has a miter structure (274), the fifth region has a flat structure (284), the sixth region has a miter structure (294) and the seventh region has a flat structure (304).

Figure 46:
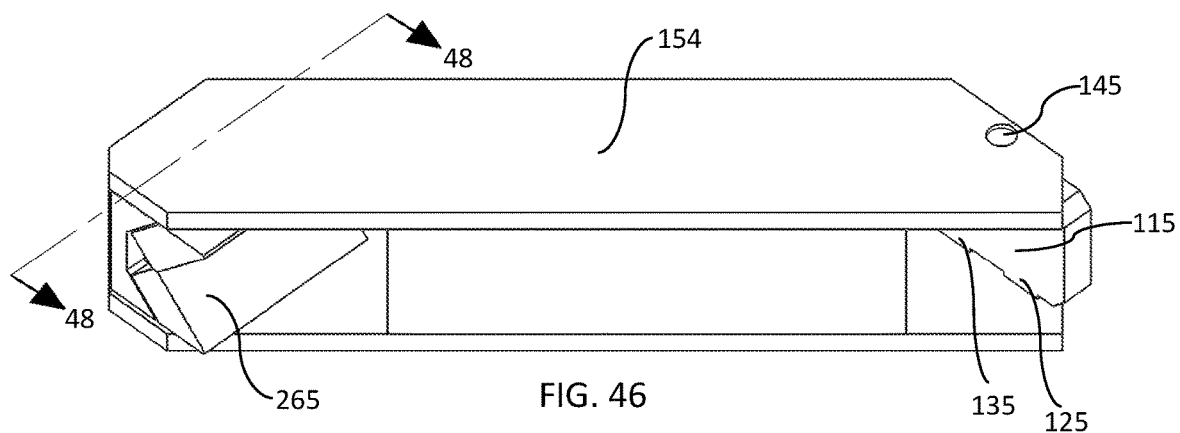
FIG. 46 is a perspective view of a mirror-based assembly with miter and non-miter connection regions, namely, a lateral transfer hollow retroreflector with a roof mirror assembly having a four miter joint structure and a flat mirror-based assembly having a pad, pad and a pin joint structure, made in accordance with at least the fifth lateral transfer hollow retroreflector embodiment of the present invention.
Figure 47:
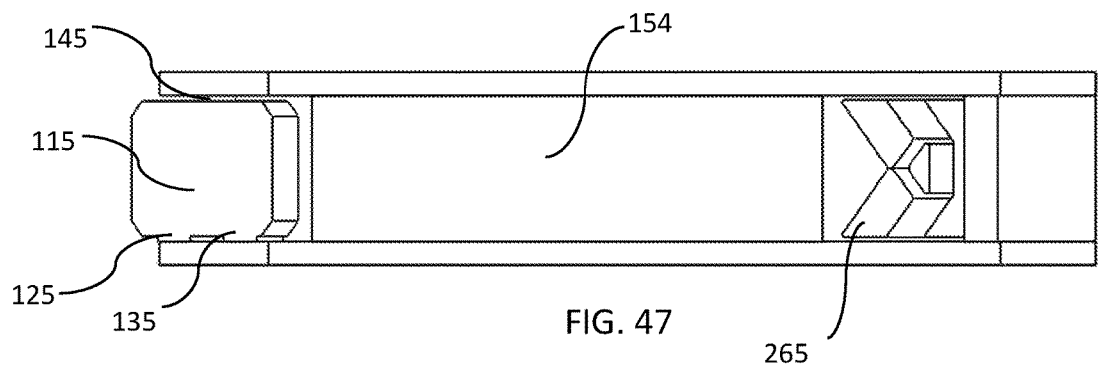
FIG. 47 is a front elevational view of the lateral transfer hollow retroreflector mirror assembly shown in FIG. 46.
Figure 48:
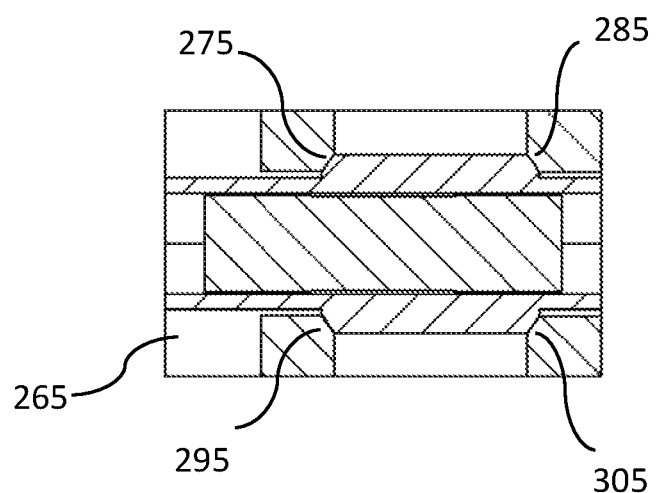
FIG. 48 is a cross-sectional view of the roof mirror shown in the lateral transfer hollow retroreflector mirror assembly of FIGS. 46-47, taken along line 48-48 of FIG. 46.

The fifth preferred embodiment of the lateral transfer hollow retroreflector (154) depicting a mirror-based assembly with miter and non-miter connection regions is depicted in FIGS. 46-48, showing the flat mirror assembly (115) and roof mirror assembly (265). In combination, there are a total of three mirror panels having a first connection region (125), a second connection region (135), a third connection region (145), a fourth connection region (275), a fifth connection region (285), a sixth connection region (295), and a seventh connection region (305). In this fourth embodiment for a lateral transfer hollow retroreflector showing attachment via several support member as an example, the first connection region has a pad structure (125), the second region has a pad structure (135), the third region has a pin structure (145), the fourth region has a miter structure (275), the fifth region has a miter structure (285), the sixth region has a miter structure (295) and the seventh region has a miter structure (305).

A method for the embodiment of the mirror-based is necessary for the proper functionality of such a device. The method would involve assembling the at least one support member to a mirror panel by the first connection region having a miter joint, assembling the at least one support member to a mirror panel by the second connection region having a non-miter joint, and assembling the at least one support member to a mirror panel by the third connection region. The process is ordered such that the non-miter joint structures are first connected, such as a pin or pad inserted or a flat pushed evenly to the other flat surface, followed by contact and connecting to the miter regions. These method steps may also be done concurrently. Other ordering of steps may also be considered that may be advantageous as needed to achieve the final requirements of the mirror-based assembly.

It will thus be seen that the objects set forth above, among those made apparent from the preceding description, are efficiently attained, and, since numerous/certain changes may be made in the above constructions without departing from the spirit and scope of the invention, it is intended that all matter contained in the above description and shown in the accompanying drawings shall only be interpreted as illustrative and not in a limiting sense.

It is also to be understood that the following claims are intended to cover all of the generic and specific features of the invention herein described, and all statements of the scope of the invention which, as a matter of language, might be said to fall therebetween.

The invention claimed is:

1. A mirror-based assembly that minimizes beam deviation, the mirror-based assembly comprising:
   a mirror panel; and
   a pair of support members,
   wherein the mirror panel comprises a plurality of connection regions, including a first connection region comprising a miter joint structure, a second connection region comprising a non-miter connection region and a third connection region,
   wherein the mirror panel is connected to one of the pair of support members at the first connection region by the miter joint structure and the second connection region by the non-miter connection region to minimize stress due to expansion or contraction at the first and second connection regions of the mirror panel to minimize beam deviation while operationally undergoing a temperature change,
   wherein the first and second connection regions are longitudinally arranged along a base portion of the mirror panel,
   wherein the mirror panel is connected, at the third connection region, to another of the pair of support members, and
   wherein the third connection region of the mirror panel comprises a pin joint structue.

2. The mirror-based assembly as recited in claim 1, wherein the non-miter connection region comprises a flat joint structure.

3. The mirror-based assembly as recited in claim 1, wherein the non-miter connection region comprises a pin joint structure.

4. The mirror-based assembly as recited in claim 1, wherein the non-miter connection region comprises a pad joint structure.

5. The mirror-based assembly as recited in claim 1, wherein the mirror panel further comprises a fourth connection region, wherein the third connection region or the fourth connection region comprises a miter joint structure.

6. The mirror-based assembly as recited in claim 1, comprising a retroreflector construction.

7. The mirror-based assembly as recited in claim 1, comprising a flat mirror construction.

8. The mirror-based assembly as recited in claim 1, comprising a roof mirror construction, including at least two mirror panels.

9. A mirror-based assembly, comprising:
   a mirror panel; and
   a pair of support members,
   wherein the mirror panel comprises a plurality of connection regions, including a first connection region comprising a miter joint structure, a second connection region comprising a non-miter connection region and a third connection region,
   wherein the mirror panel is connected to one of the pair of support members at the first connection region by the miter joint structure and the second connection region by the non-miter connection region to minimize stress due to thermal expansion or contraction of the mirror panel,
   wherein the mirror panel is connected, at the third connection region, to another of the pair of support members, and
   wherein the third connection region comprise a pin joint structure.

10. A mirror-based assembly, comprising:
    a mirror panel; and
    a pair of support members,
    wherein the mirror panel comprises a plurality of connection regions, including a first connection region comprising a miter joint structure, a second connection region comprising a non-miter connection region and a third connection region,
    wherein the mirror panel is connected to one of the pair of support members at the first connection region by the miter joint structure and the second connection region by the non-miter connection region to minimize stress due to thermal expansion or contraction of the mirror panel,
    wherein the mirror panel is connected, at the third connection region, to another of the pair of support members,
    wherein the mirror panel comprises at least one recess, and
    wherein the third connection region of the mirror panel comprises a pin joint structure.

11. A lateral transfer hollow retroreflector device that minimizes beam deviation, comprising:
    a subassembly comprising a mirror panel and a support member, the subassembly being configured to minimize beam deviation, wherein the mirror panel comprises a plurality of connection regions, including a first connection region comprising a miter joint structure, a second connection region comprising a non-miter connection region, and a third connection region comprising a pin joint structure, wherein the mirror panel is connected to the support member by the miter joint structure of the first connection region and the non-miter connection region of the second connection region to minimize stress due to expansion or contraction at the first and second connection regions of the mirror panel while operationally undergoing a temperature change, and wherein the first and second connection regions are longitudinally arranged along a base portion of the mirror panel.

12. A lateral transfer hollow retroreflector device that minimizes beam deviation, the device comprising:

a mirror panel; and a support member, wherein the mirror panel comprise a plurality of connection regions, including a first connection region comprising a miter joint structure, a second connection region comprising a non-miter connection region, and a third connection region comprising a pin joint structure, wherein the mirror panel is connected, at the first connection region and the second connection region, to the support member to minimize stress due to expansion or contraction at the first and second connection regions of the at least one mirror panel to minimize beam deviation while operationally undergoing a temperature change, and wherein the first and second connection regions are longitudinally arranged along a base portion of the mirror panel.

13. For a mirror-based assembly that minimizes beam deviation and comprises at least one support member having a miter connection region and a non-miter connection region and a mirror panel having a plurality of connection regions, including a first connection region comprising a miter joint structure, a second connection region comprising a non-miter connection region and a third connection region, wherein each of the first connection region and the second connection region of the mirror panel is connected to the at least one support member to minimize stress due to thermal expansion or contraction of the mirror panel, a method of assembling the mirror-based assembly that minimizes beam deviation, comprising:

attaching the miter connection region of the at least one support member to the miter joint structure of the first connection region of the mirror panel; and attaching the non-miter connection region of the at least one support member to the non-miter connection region of the second region of the mirror panel to minimize stress due to expansion or contraction of at least the first and second connection regions of the mirror panel and minimize beam deviation while operationally undergoing a temperature change, wherein the first and second connection regions are longitudinally arranged along a base portion of the mirror panel, and wherein the third connection region of the mirror panel comprises a pin joint structure.

14. The method as recited in claim 13, wherein the non-miter connection region of the second region of the mirror panel comprises a flat joint structure.

15. The method as recited in claim 13, wherein the non-miter connection region of the second region of the mirror panel comprises a pad joint structure.

16. The method as recited in claim 13, wherein the mirror panel comprises a fourth connection region, such that at least one of the third and fourth connection regions comprises a miter joint structure.

\* \* \* \* \*